(12) United States Patent
Kise et al.

(10) Patent No.: US 11,009,378 B2
(45) Date of Patent: May 18, 2021

(54) FLOW RATE MEASURING DEVICE

(71) Applicant: MITSUBISHI ELECTRIC CORPORATION, Chiyoda-ku (JP)

(72) Inventors: Koji Kise, Chiyoda-ku (JP); Takashi Moriyama, Chiyoda-ku (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 167 days.

(21) Appl. No.: 16/469,516

(22) PCT Filed: Dec. 21, 2017

(86) PCT No.: PCT/JP2017/046038
§ 371 (c)(1),
(2) Date: Jun. 13, 2019

(87) PCT Pub. No.: WO2018/142797
PCT Pub. Date: Aug. 9, 2018

(65) Prior Publication Data
US 2020/0003595 A1  Jan. 2, 2020

(30) Foreign Application Priority Data
Feb. 6, 2017 (JP) .............................. JP2017-019357

(51) Int. Cl.
*G01F 1/684* (2006.01)
*F02D 35/00* (2006.01)
*G01F 1/72* (2006.01)

(52) U.S. Cl.
CPC ............. *G01F 1/684* (2013.01); *F02D 35/00* (2013.01); *G01F 1/72* (2013.01)

(58) Field of Classification Search
CPC . G01F 1/684; G01F 1/72; F02D 35/00; F02D 41/187; F02M 35/10386
See application file for complete search history.

(56) References Cited

U.S. PATENT DOCUMENTS

| | | | | |
|---|---|---|---|---|
| 6,240,775 B1* | 6/2001 | Uramachi | ............. | G01F 1/6842 73/114.34 |
| 8,573,051 B2* | 11/2013 | Ueda | ......................... | G01F 5/00 73/202 |
| 10,907,762 B2* | 2/2021 | Kitahara | ............... | G01F 1/6842 |

FOREIGN PATENT DOCUMENTS

| | | |
|---|---|---|
| JP | 2000-304585 A | 11/2000 |
| JP | 2012-93269 A | 5/2012 |

(Continued)

OTHER PUBLICATIONS

International Search Report dated Jan. 23, 2018 in PCT/JP2017/046038 filed on Dec. 21, 2017.

*Primary Examiner* — Freddie Kirkland, III
(74) *Attorney, Agent, or Firm* — Xsensus LLP

(57) ABSTRACT

Provided is a flow rate measuring device including a connector portion, a main body portion, an internal flow passage, and a flow rate detection element. The internal flow passage includes a main flow passage and a sub-flow passage. The sub-flow passage includes a flow rate detection element-side flow passage and connection flow passages. The main flow passage includes an introduction portion, a small flow passage sectional area portion, and an exit portion. The connection flow passages include an upstream-side connection flow passage and a downstream-side connection flow passage. The main flow passage and the flow rate detection element-side flow passage are formed so as to be symmetric with respect to a plane having a flow direction of the fluid to be measured flowing through the pipe as a normal. The main flow passage has a portion at the plane of symmetry as the small flow passage sectional area portion.

15 Claims, 28 Drawing Sheets

(56) References Cited

FOREIGN PATENT DOCUMENTS

JP       2014-1954 A    1/2014
JP       2015-68792 A    4/2015

* cited by examiner

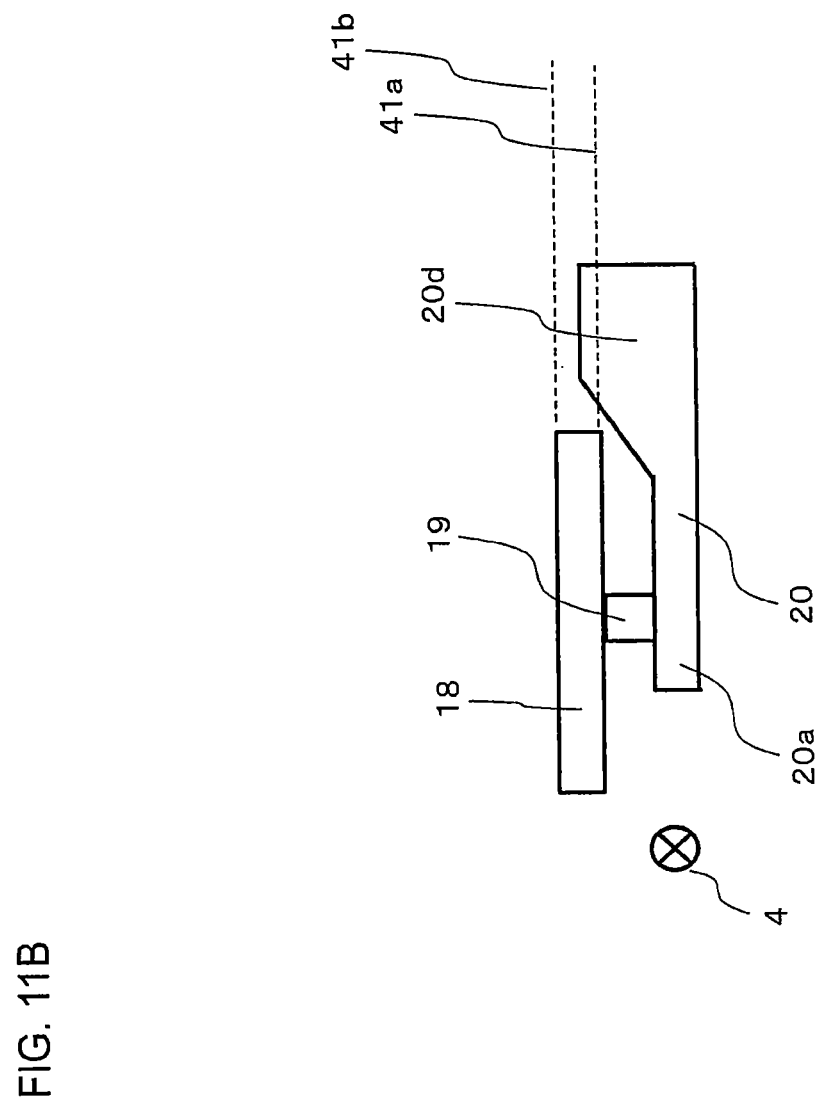

FLOW RATE MEASURING DEVICE

CROSS-REFERENCE TO RELATED APPLICATIONS

This application is a United States national stage application of International Application No. PCT/JP2017/046038, filed Dec. 21, 2017, which designates the United States, and claims priority to Japanese Patent Application No. 2017-019357, filed Feb. 6, 2017, and the entire contents of each of the above applications are hereby incorporated herein by reference in entirety.

TECHNICAL FIELD

The present invention relates to a flow rate measuring device suitable for, for example, measurement of an intake air amount of an internal combustion engine for a vehicle.

BACKGROUND ART

In a related-art flow rate detecting device, in addition to a main flow passage configured to introduce part of a gas to be measured flowing through a pipe, a flow rate detection element-side flow passage is installed on the same plane. The flow rate detection element-side flow passage is configured to introduce part of the gas to be measured flowing in the main flow passage (see, for example, Patent Literature 1).

CITATION LIST

Patent Literature

[PTL 1] JP 2015-68792 A

SUMMARY OF INVENTION

Technical Problem

However, the related art has the following problem. For example, in a flow rate measuring device to be applied to an internal combustion engine for a vehicle, an airflow fluctuates (pulsates) through an operation of a piston of an internal combustion engine (engine). In some cases, a backflow may be generated.

The flow rate measuring device described above is designed to provide high contamination resistance, high detection sensitivity, and high detection accuracy when the air flows forward. Thus, when the air flows in another direction, the air passage structure thereof may become different from a suitable one. As a result, there arises a problem in that the above-mentioned performances are reduced.

The present invention has been made to solve the problem described above, and has an object to provide a flow rate measuring device capable of preventing breakdown of a detection element and reduction in measurement accuracy due to contaminants not only when a flow rate, which is a measurement target, is forward but also when the flow rate is backward.

Solution to Problem

According to one embodiment of the present invention, there is provided a flow rate measuring device, including: a connector portion, which is arranged outside a pipe through which a fluid to be measured flows, and is configured to transmit and receive a signal to and from an exterior; a main body portion extended from the connector portion so as to be located in the pipe; an internal flow passage, which is formed inside the main body portion, and is configured to cause part of the fluid to be measured flowing through the pipe to flow therethrough; and a flow rate detection element, which is installed in the internal flow passage, and is configured to detect a flow rate of the fluid to be measured, wherein the internal flow passage includes: a main flow passage configured to extend from an inflow port configured to introduce the part of the fluid to be measured flowing through the pipe to an outflow port configured to return the introduced part of the fluid to be measured to the pipe; and a sub-flow passage branching from the main flow passage to bypass the main flow passage, wherein the sub-flow passage includes: a flow detection element-side flow passage in which the flow rate detection element configured to detect the flow rate of the fluid to be measured from a flow rate of a measurement fluid is installed; and connection flow passages configured to connect the main flow passage and the flow rate detection element-side flow passage to each other, wherein the main flow passage includes: an introduction portion configured to guide the fluid to be measured, which has flown into the main body portion from the inflow port, into the main body portion; a small flow passage sectional area portion having a flow passage sectional area smaller than a flow passage sectional area of the introduction portion; and an exit portion, which has a flow passage sectional area larger than the flow passage sectional area of the small flow passage sectional area portion, and is configured to guide the fluid to be measured to the outflow port, wherein the connection flow passages include: an upstream-side connection flow passage connected to the main flow passage at a position on the inflow port side with respect to the small flow passage sectional area portion; and a downstream-side connection flow passage connected to the main flow passage at a position on the outflow port side with respect to the small flow passage sectional area portion, and the connection flow passages are configured to introduce part of the fluid to be measured flowing through the main flow passage via the upstream-side connection flow passage as a measurement fluid to cause the measurement fluid to flow through the flow rate detection element-side flow passage and return the measurement fluid to the main flow passage via the downstream-side connection flow passage, wherein the main flow passage and the flow rate detection element-side flow passage are formed so as to be symmetric with respect to a plane having a flow direction of the fluid to be measured flowing through the pipe as a normal, and wherein the main flow passage has a portion at the plane of the symmetry as the small flow passage sectional area portion.

Advantageous Effects of Invention

According to one embodiment of the present invention, a bypass flow passage includes the main flow passage, the connection flow passages, and the flow rate detection element-side flow passage. The main flow passage and the flow rate detection element-side flow passage are formed so as to be approximately symmetric with respect to the plane having the flow direction of the fluid to be measured as the normal. The portion of the main flow passage, with which the plane of symmetry intersects, is formed as the small flow passage sectional area portion. The connection flow passage configured to introduce the measurement fluid into the flow rate detection element-side flow passage is connected to the main flow passage at a position at which the flow passage sectional area of the main flow passage changes. As a result, the flow rate measuring device capable of preventing the breakdown of the detection element and the reduction in measurement accuracy due to the contaminants not only when the flow rate, which is the measurement target, flows forward but also when the flow rate flows backward is obtained.

BRIEF DESCRIPTION OF DRAWINGS

FIG. 11B is an explanatory view for illustrating the shape of the flow passage in the flow rate measuring device according to the second embodiment of the present invention.

DESCRIPTION OF EMBODIMENTS

Now, with reference to the drawings, a flow rate measuring device according to exemplary embodiments of the present invention is described.

First Embodiment

Figure 1:
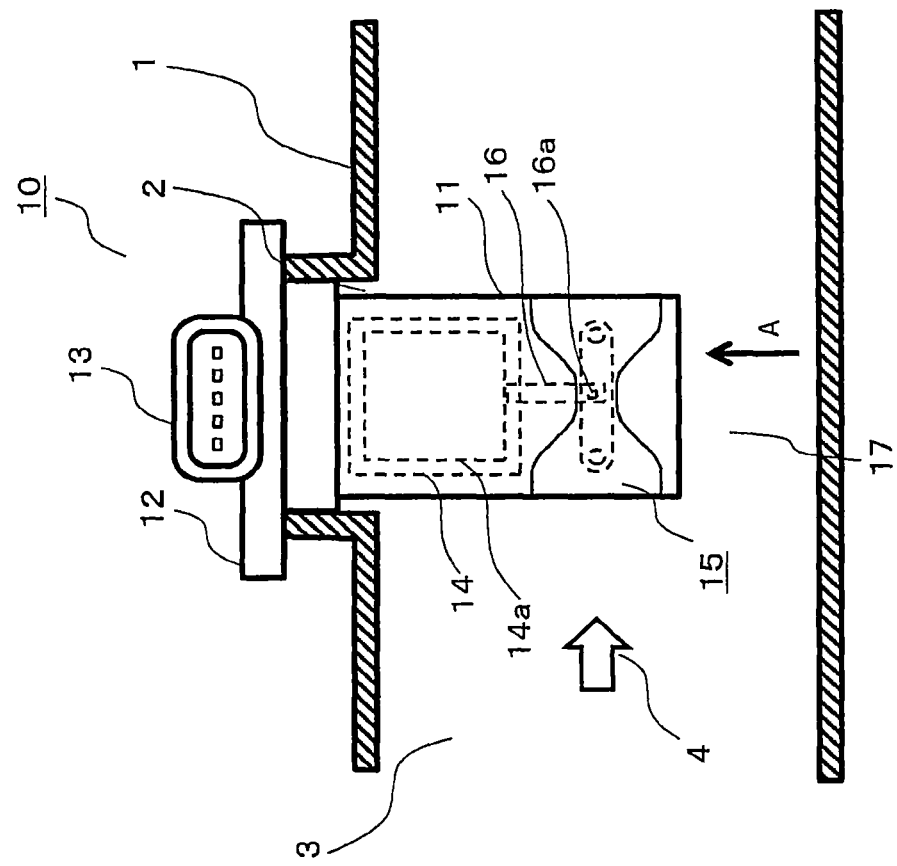
FIG. 1 is a front view for illustrating a state in which a flow rate measuring device according to a first embodiment of the present invention is mounted into a pipe for an internal combustion engine.

FIG. 1 is a front view for illustrating a state in which a flow rate measuring device according to a first embodiment of the present invention is mounted into a pipe for an internal combustion engine. A main body portion 11 of a flow rate measuring device 10 is inserted into a pipe 1 from a device insertion hole 2 and is fixed to the pipe 1 with a flange portion 12. The main body portion 11 includes a connector portion 13, a circuit accommodating portion 14, and a flow passage 15 inside the flow rate measuring device along an insertion direction into the pipe 1.

In the circuit accommodating portion 14, a circuit board 14a is accommodated. On the circuit board 14a, a control circuit, which is configured to drive a flow rate detection element 16, and to process a signal therefrom is mounted. A drive power supply for the circuit and the flow rate signal are connected to an exterior via the connector portion 13.

In the first embodiment, a fluid to be measured in the pipe 1 is air. Most part of air 4 flowing through the pipe 1 flows through a pipe-side flow passage 17. However, part of the air 4 flows through the flow passage 15 inside the flow rate measuring device 10. The flow passage 15 corresponds to a bypass flow passage provided for measuring a flow rate of the fluid to be measured, and the fluid flowing through the bypass flow passage corresponds to a bypass fluid.

Figure 2:
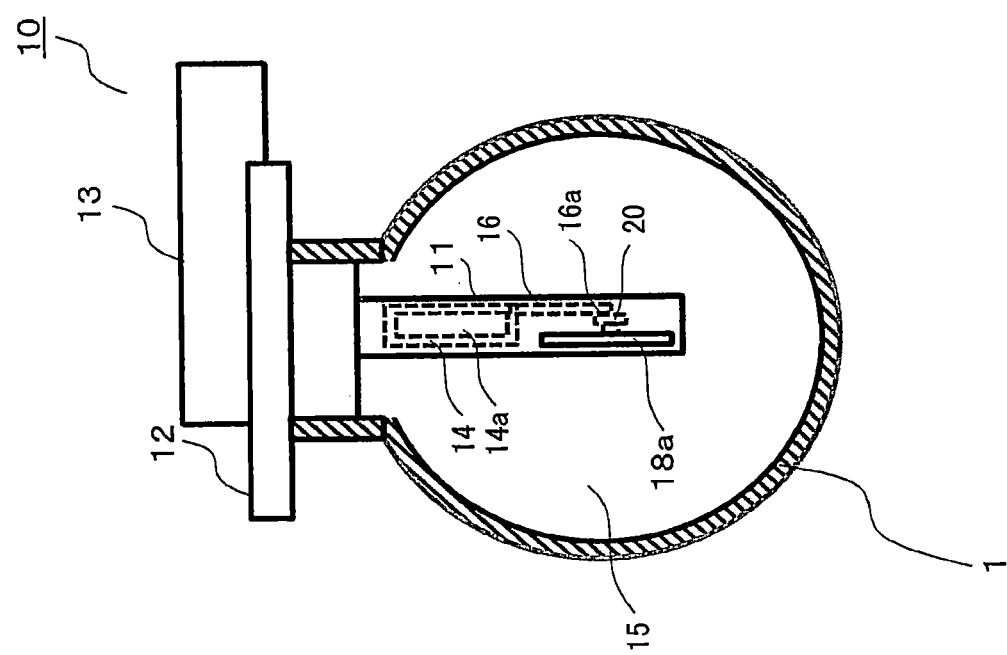
FIG. 2 is a view when the flow rate measuring device in the first embodiment of the present invention is viewed from a flow direction of air in the pipe.

FIG. 2 is a view when the flow rate measuring device 10 in the first embodiment of the present invention is viewed from a flow direction of the air 4 in the pipe 1. In order to suppress increase in pressure loss, the flow rate measuring device 10 has a shape which is narrow in a right-and-left direction on the paper of FIG. 2 (radial direction of the pipe 1) so as to reduce a sectional area in a direction perpendicular to the flow of the air.

The flow passage 15 in the flow rate measuring device 10 is long in a depth direction on the paper of FIG. 2, specifically, a right-and-left direction on the paper of FIG. 1 (flow direction in the pipe 1).

The flow passage 15 illustrated in FIG. 2 introduces the air from an air inflow port 18a. The air inflow port 18a is generally formed so that, as illustrated in FIG. 2, a center of gravity of the air inflow port 18a is located at a center of the pipe 1.

However, when importance is placed on symmetry of air flowing between the flow rate measuring device 10 and the pipe 1, the air inflow port 18a is sometimes formed so that a distance between a wall face of the main body portion 11 and a wall face of the pipe 1 becomes uniform.

Figure 3:
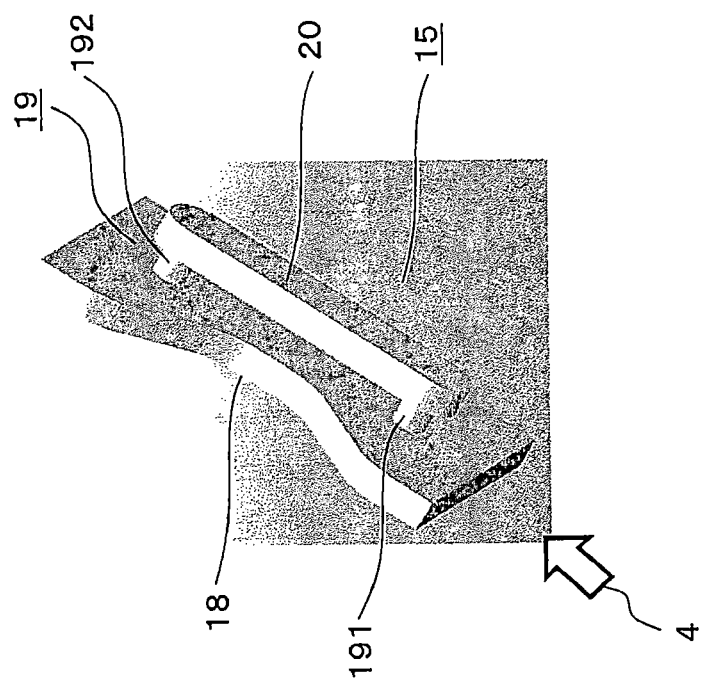
FIG. 3 is a perspective view of a flow passage in the flow rate measuring device in the first embodiment of the present invention.

FIG. 3 is a perspective view of the flow passage 15 in the flow rate measuring device 10 in the first embodiment of the present invention. The flow passage 15 includes a main flow passage 18, connection flow passages 19, and a flow rate detection element-side flow passage 20. The connection flow passages 19 are provided at two positions. Specifically, the connection flow passages 19 include a connection flow passage 191 on an upstream side and a connection flow passage 192 on a downstream side with respect to the air 4 flowing through the pipe.

Figure 4:
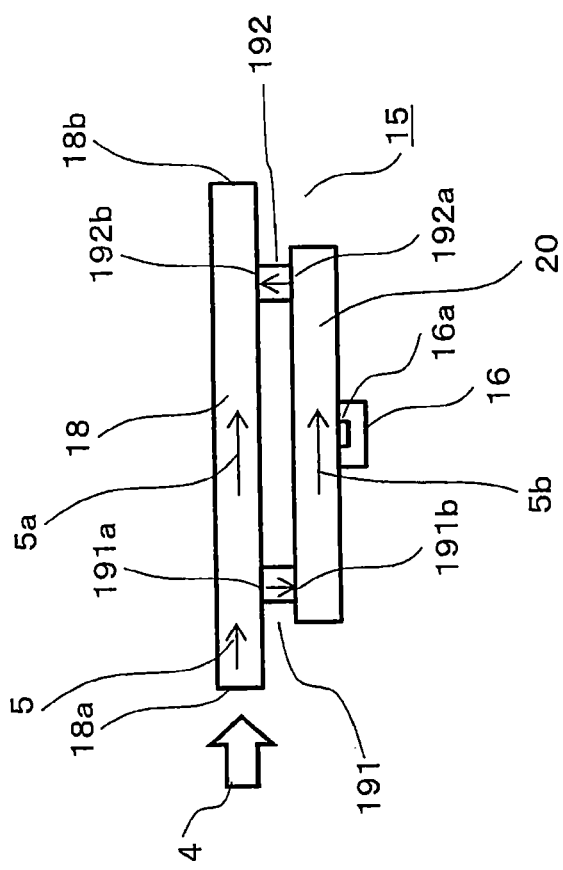
FIG. 4 is a side view when the flow passage in the flow rate measuring device is viewed from a direction indicated by the arrow A on the front view of FIG. 1 in the first embodiment of the present invention.

FIG. 4 is a side view when the flow passage 15 in the flow rate measuring device 15 is viewed from a direction indicated by the arrow A on the front view of FIG. 1 in the first embodiment of the present invention. The main flow passage 18 has the inflow port 18a and an outflow port 18b.

The connection flow passage 191 has an inflow port 191a (hereinafter referred to also as "connecting portion 191a") and an outflow port 191b. Similarly, the connection flow passage 192 has an inflow port 192a and an outflow port 192b (hereinafter referred to also as "connecting portion 192b"). The outflow port 191b of the connection flow passage 191 serves as an inflow port of the flow rate detection element-side flow passage 20, and the inflow port 192a of the connection flow passage 192 serves as an outflow port of the flow rate detection element-side flow passage 20.

As is understood from FIG. 1 to FIG. 4, the main flow passage 18 has a flat shape. Each of the inflow port 18a and the outflow port 18b has a long width along a direction of a line for connecting the center of the pipe and a mounting face of the flow rate measuring device 10. A middle portion of the main flow passage 18 is narrowly constricted.

The flow rate detection element-side flow passage 20 has a width narrower than that of each of the width of the inflow port 18a and the width of the outflow port 18b of the main flow passage 18 and is arranged in parallel to the main flow passage 18.

In FIG. 4 in the first embodiment, the connection flow passages 19 are connected so as to be perpendicular to the main flow passage 18 and the flow rate detection element-side flow passage 20. Each of the connection flow passages 19 is formed as a flow passage having a width smaller than that of the flow rate detection element-side flow passage 20.

The connection flow passages 191 and 192 are arranged on both sides of the constricted middle portion of the main flow passage 18 in a front-and-rear direction. In the first embodiment, each of the connection flow passages 191 and 192 is formed as a flow passage having a width smaller than that of the flow rate detection element-side flow passage 20.

The above-mentioned configuration as illustrated in FIG. 3 and FIG. 4 is more concisely described as follows.

The main flow passage 18 has a portion having a small flow passage sectional area, which corresponds to the constricted middle portion.

The inflow port 191a of the connection flow passage 19 is arranged on the upstream side of the portion of the main flow passage 18, which has the smallest flow passage sectional area.

Meanwhile, the outflow port 191b of the connection flow passage 19 is arranged on the downstream side of the portion of the main flow passage 18, which has the smallest flow passage sectional area.

With the above-mentioned configuration of the flow passage 15, straight lines that are parallel to the flow direction of the fluid to be measured intersect with each of the inflow port 18a of the main flow passage 18 and the outflow port 18b of the main flow passage 18. At least part of the straight line is not in contact with a wall face of the main flow passage 18.

Accordingly, as illustrated in FIG. 4, most part of air 5 flowing from the inflow port 18a into the flow passage 15 directly flows straight to turn into air 5a, which flows out from the outflow port 18b without flowing through the flow rate detection element-side flow passage 20. Thereafter, the air 5a merges into the air flowing through the pipe-side flow passage 17 illustrated in FIG. 1.

Meanwhile, part of the air 5 flowing from the inflow port 18a into and through the flow passage 15 flows into the flow rate detection element-side flow passage 20 to turn (merge) into the air 5b flowing through the flow rate detection element-side flow passage 20. The fluid flowing into the flow rate detection element-side flow passage 20 corresponds to a measurement fluid.

After a flow rate of the air 5b is measured in a detecting portion 16a of the hot-wire type flow rate detection element 16, the air 5b merges into the air 5a, which flows through the main flow passage 18 without flowing through the flow rate detection element-side flow passage 20, via the connection flow passage 192.

The flow rate detection element 16 in the first embodiment is a hot-wire type flow meter. The flow rate detection element 16 calibrates a relationship between an output of the flow rate detection element 16 and the flow rate of the air 4 flowing through the pipe 1 in advance, to thereby provide high measurement accuracy.

Based on the above-mentioned basic configuration of FIG. 1 to FIG. 4, the present invention has first to fifth configurations described below. With the first to fifth configurations, prevention of breakdown of the detection element and reduction in measurement accuracy due to contaminants is achieved not only when the flow rate, which is a measurement target, flows forward but also when the flow rate flows backward.

A first configuration: the flow passage 15 has an approximately symmetric structure with respect to a plane having the flow direction of the air 4 flowing through the pipe 1 as a normal.

A second configuration: the main flow passage 18 has a region in which the flow rate is reduced.

A third configuration: a projection plane of the main flow passage 18 and a projection plane of the flow rate detection element-side flow passage 20 are separate from each other on the plane having the flow direction of the air 4 flowing through the pipe 1 as the normal.

A fourth configuration: the connection flow passages 19 are connected at an angle equal to or larger than 90 degrees with respect to the flow of the air 4 flowing through the pipe 1.

A fifth configuration: the flow rate detection element-side flow passage 20 has large spaces at portions connected to the connection flow passages 19.

Details and effects of the first to fifth configurations described above are described in more detail with reference to FIG. 5 to FIG. 10.

Figure 5:
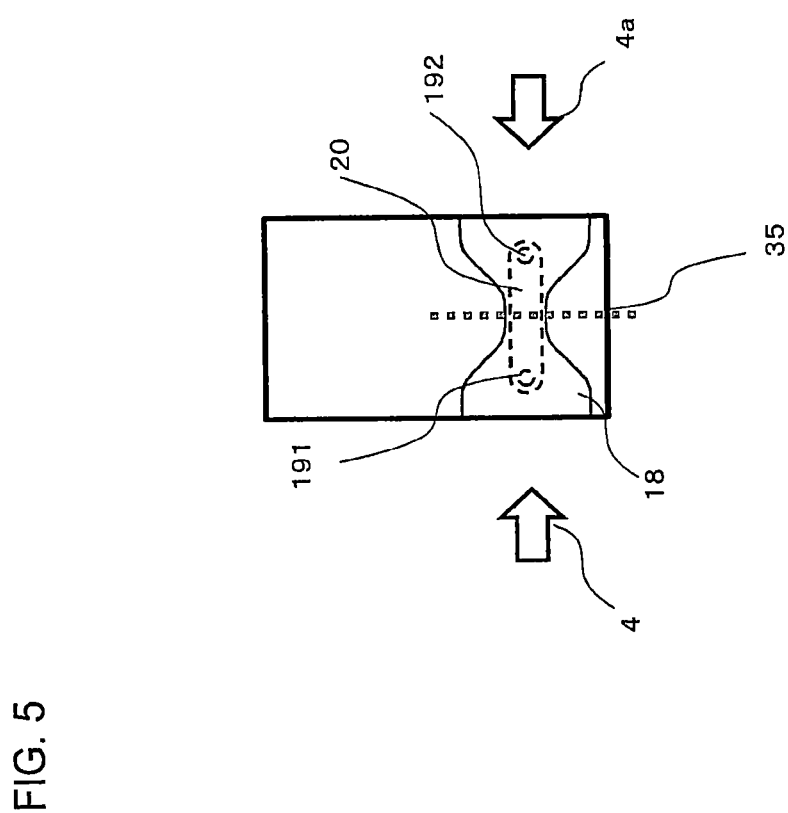
FIG. 5 is an explanatory view for illustrating a positional relationship between a main flow passage, a flow rate detection element-side flow passage, and connection flow passages with respect to a plane of symmetry for the flow passages according to the first embodiment of the present invention.

First, the first configuration in the first embodiment is described. FIG. 5 is an explanatory view for illustrating a positional relationship among the main flow passage 18, the flow rate detection element-side flow passage 20, and the connection flow passages 19 with respect to a plane of symmetry for the above-mentioned flow passages. In the first embodiment, as illustrated in FIG. 5, each of the main flow passage 18 and the flow rate detection element-side flow passage 20 is approximately symmetric with respect to a plane 35 having the flow direction of the air 4 flowing through the pipe as the normal.

Next, the effect of the first configuration is described. In the engine, the flow of air pulsates or a backflow is generated through an operation of a piston in some cases. Even in such a case, with a flow passage structure that is approximately symmetric with respect to the flow direction as illustrated in FIG. 5, the same air passage as an air passage design for flow in a forward direction, which provides high detection sensitivity and detection accuracy, is also formed for flow in an opposite direction. Consequently, the flow rate measuring device 10 described in the first embodiment can achieve high detection sensitivity and detection accuracy.

Figure 6:
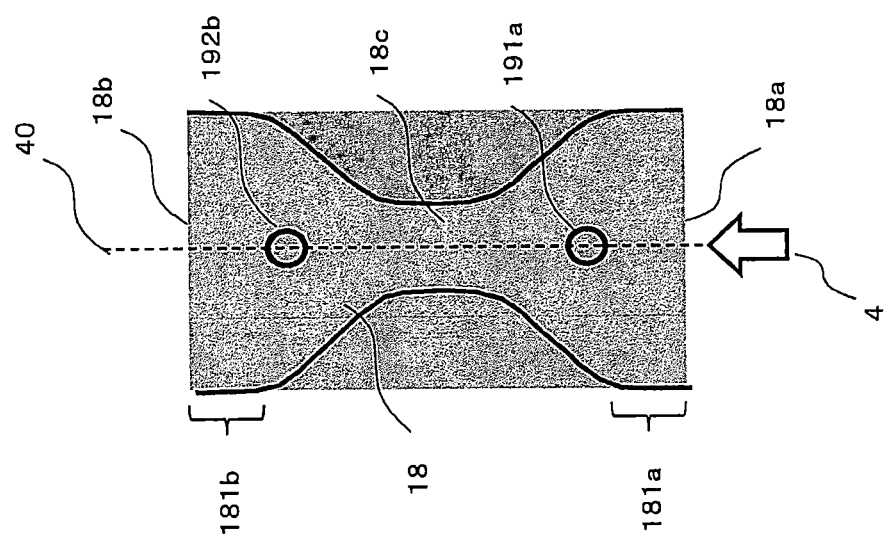
FIG. 6 is an explanatory view for illustrating a flow passage shape of the main flow passage in the first embodiment of the present invention.

Next, the second configuration in the first embodiment is described. FIG. 6 is an explanatory view for illustrating a flow passage shape of the main flow passage 18 in the first embodiment of the present invention. In the first embodiment, as illustrated in FIG. 6, the flow passage 18 is formed to have a portion 18c having a small flow passage sectional area (also referred to as "small flow passage sectional area portion 18c"). The main flow passage 18 starts with the inflow port 18a, and is smoothly narrowed through a straight portion 181a. Then, the main flow passage 18 is smoothly enlarged through the small flow passage sectional area portion 18c. After a straight portion 181b, the main flow passage 18 arrives at the outflow port 18b.

The straight portion 181a corresponds to a first straight portion, and the straight portion 181b corresponds to a second straight portion. A portion of the flow passage, which is smoothly narrowed after the straight portion 181a, corresponds to a first transition portion, and a portion of the flow passage, which is smoothly enlarged after the smallest flow passage sectional area portion 18c, corresponds to a second transition portion.

The inflow port 18a, the smallest flow passage sectional area portion 18c of the main flow passage 18, and the outflow port 18b are formed so as to be located on an approximately straight line.

The connection flow passages 19 are provided so that at least a portion of the connecting portion 191a is located in a region other than the straight portion 181a and at least a portion of the connecting portion 192b is located in a region other than the straight portion 181b. In FIG. 6, the connecting portion 191a is located in a region between the straight portion 181a and the smallest flow passage sectional area portion 18c, in which the flow passage is gradually narrowed. Meanwhile, the connecting portion 192b is located in a region between the smallest flow passage sectional area portion 18c and the straight portion 181b, in which the flow passage is gradually enlarged.

Accordingly, in the structure described above, at least part of straight line 40, which intersects with the inflow port 18a and the outflow port 18b of the main flow passage 18, and is parallel to the flow direction of the air 4, is not in contact with the wall face of the main flow passage 18.

Next, the effects of the second configuration are described. The inflow port 18a, the smallest flow passage sectional area portion 18c, and the outflow port 18b are formed so as to be arranged on the straight line 40. Thus, after the contaminants having larger inertia flow into the main flow passage 18 from the inflow port 18a, the contaminants are configured to flow directly to the outflow port 18b without being turned. Specifically, the contaminants are not decelerated, and hence, are unlikely to flow into the flow rate detection element-side flow passage 20.

Further, with the formation of the small flow passage sectional area portion 18c, a pressure loss is generated due to contracted flow. Accordingly, a large difference is generated in static pressure between the connecting portions 191a and 192b. As a result, the flow rate flowing through the flow rate detection element-side flow passage 20 formed so as to be connected to the connecting portions 191a and 192b can be increased.

In the first embodiment, the formation of the small flow passage sectional area portion 18c through reduction of a length in a long-side direction of the inflow port 18a has been described. However, the configuration of the present invention is not limited thereto. The small flow passage sectional area portion 18c may be formed through reduction of a length in a short-side direction of the inflow port 18a.

The straight portion 181a has a function of stabilizing the flow of the inflow fluid. The straight portion 181b has a function of stabilizing the flow of the outflow fluid. In the first embodiment, the structure is symmetric. Thus, the straight portions 181a and 181b are approximately parallel to each other, are located on the approximately same straight line, and have the approximately same sectional area. Each of the connecting portions 191a and 192b of the connection flow passages 19 is formed on the side closer to the smallest flow passage sectional area portion 18c with respect to the straight portions 181a and 181b so as to cause the stably flowing fluid to be introduced into the detection element-side flow passage.

In the first embodiment, the connecting portions 191a and 192b of the connection flow passages 19 are formed so as to be located on the straight line 40 for connecting the inflow port 18a, the smallest flow passage sectional area portion 18c of the main flow passage 18, and the outflow port 18b.

Figure 7:
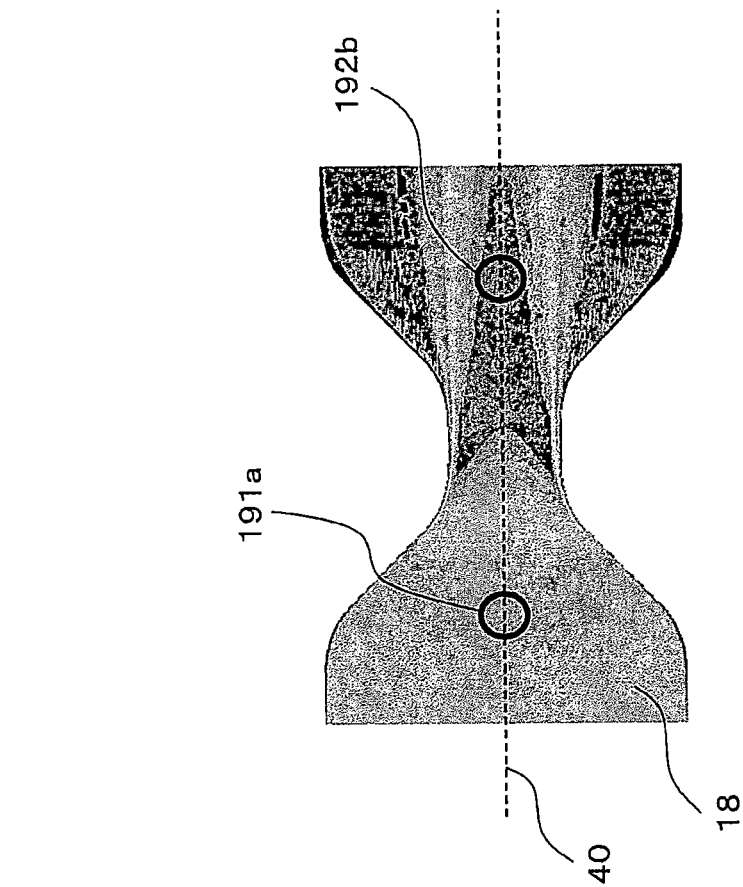
FIG. 7 is an explanatory view for illustrating an airflow velocity distribution in the main flow passage in the first embodiment of the present invention.

FIG. 7 is an explanatory view for illustrating an airflow velocity distribution in the main flow passage 18 in the first embodiment of the present invention. In FIG. 7, a darker region has a higher flow velocity. As illustrated in FIG. 7, the connection portion 192b has a particularly high flow velocity. Therefore, accumulation of the contaminants due to, for example, stagnation of the fluid flowing in the main flow can be suppressed.

The connecting portion 192b is not formed in a stagnant region. Thus, when a flow direction changes from forward to backward, the contaminant staying in the stagnant region can be prevented from flowing into the flow rate detection element-side flow passage 20.

Next, the third configuration in the first embodiment is described. As illustrated in FIG. 3 referred to above, the main flow passage and the flow rate detection element-side flow passage 20 are installed so as to be parallel to each other, and are connected to each other through the connection flow passages 191 and 192 to form a three-dimensional structure.

Specifically, when the main flow passage 18 and the flow rate detection element-side flow passage 20 are projected onto the plane having the flow direction of the air 4 through the pipe as the normal, the main flow passage 18 and the flow rate detection element-side flow passage 20 are installed in parallel to each other. Thus, the projection plane of the main flow passage 18 and the projection plane of the flow rate detection element-side flow passage 20 are separated from each other.

Figure 8:
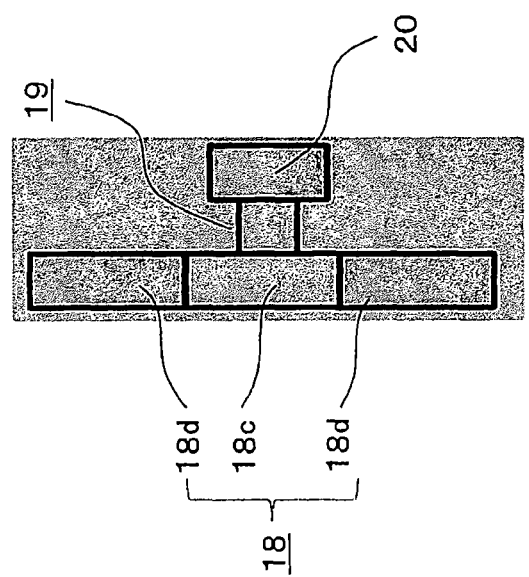
FIG. 8 is an explanatory view for illustrating projection planes of the main flow passage, the connection flow passages, and the flow rate detection element-side flow passage in the first embodiment of the present invention.

FIG. 8 is an explanatory view for illustrating the projection planes of the main flow passage 18, the connection flow passages 19, and the flow rate detection element-side flow passage 20 in the first embodiment of the present invention. The main flow passage 18 and the flow rate detection element-side flow passage 20 are connected through the connection flow passages 19.

Next, the effects of the third configuration are described. According to the first embodiment, the flow rate detection element-side flow passage 20 is provided so as to be parallel to the main flow passage 18 to form the three-dimensional structure. Accordingly, a ratio of the flow passage 15 occupying the main body portion 11 of the flow rate measuring device 10 can be reduced.

Further, there is adopted the structure in which the main flow passage 18 and the flow rate detection element-side flow passage 20 are formed as independent bodies, and are connected through the connection flow passages 19. In this manner, the functions of the main flow passage 18 are specialized to separate the contaminants and increase the flow rate of the air flowing through the flow rate detection element-side flow passage 20.

Meanwhile, the structure of the flow rate detection element-side flow passage 20 can be simplified to suppress turbulence of the flow, which may be caused by, for example, a vortex or a flow velocity distribution, to thereby increase accuracy. Therefore, the design of the flow passage can be simplified, which in turn facilitates a modification of the structure in accordance with, for example, a change in needs, and optimization of the design of the flow passage.

In the first embodiment, the main flow passage 18 and the flow rate detection element-side flow passage 20, which are provided in parallel to each other, have been described. However, the present invention is not limited thereto. The main flow passage 18 and the flow rate detection element-side flow passage 20 are not necessarily required to be parallel to each other. Specifically, as described above, it is only required that the projection plane of the main flow passage 18 and the projection plane of the flow rate detection element-side flow passage 20 be separate from each other on the plane having the flow direction of the air 4 through the pipe as the normal.

Figure 9A:
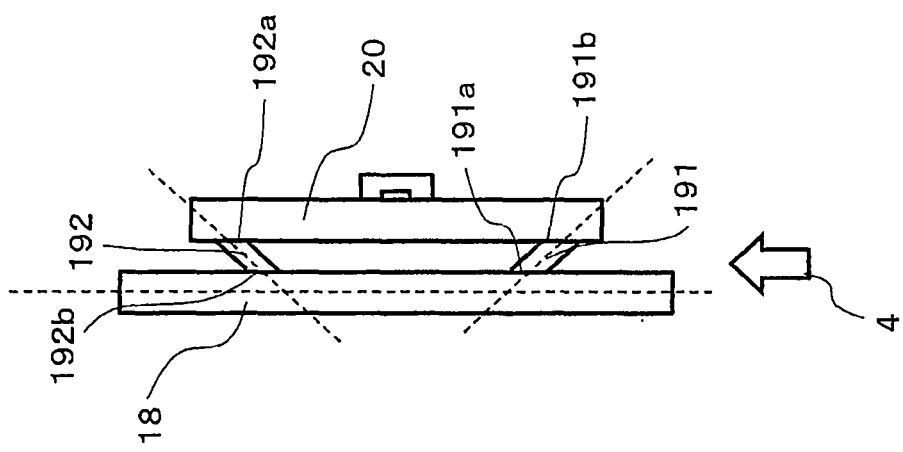
FIG. 9A is a view for illustrating a relationship between flow of air in the pipe and inclinations of the connection flow passages according to the first embodiment of the present invention.

Next, the fourth configuration in the first embodiment is described. FIG. 9 are views for illustrating a relationship between the flow of air 4 through the pipe and inclinations of the connection flow passages 19 according to the first embodiment of the present invention. FIG. 9A is an illustration of the relationship of the inclinations of the connection flow passages 19 on a plane along the flow direction of the air 4, and FIG. 9B is an illustration of the relationship of the inclinations of the connection flow passages 19 when viewed from the flow direction of the air 4.

Figure 9B:
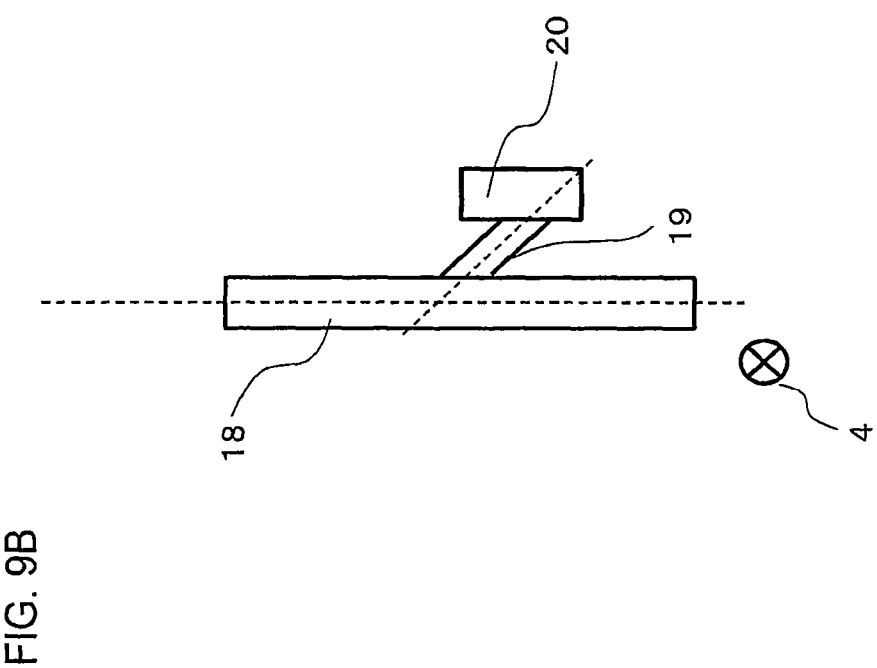
FIG. 9B is a view for illustrating a relationship between the flow of air in the pipe and the inclinations of the connection flow passages according to the first embodiment of the present invention.

In the first embodiment, the connection flow passages 19 are arranged at an angle of 90 degrees as illustrated in FIG. 4 referred to above or at an angle equal to or larger than 90 degrees as illustrated in FIG. 9A and FIG. 9B with respect to the flow direction of the air 4 through the pipe.

Next, the effects of the fourth configuration are described. In FIG. 9A, a normal of the plane of the inflow port 191a and a normal of the plane of the outflow port 191b of the connection flow passages 19 are at an angle equal to or larger than 90 degrees (including 90 degrees) with respect to the flow of air 4 flowing through the pipe.

The contaminants flowing into the main flow passage 18 are heavier than the air and therefore, has a tendency to move straight. Thus, with the connection flow passages 19 provided at the angle equal to or larger than 90 degrees with respect to the flow of the fluid, the contaminants can be further prevented from flowing into the flow rate detection element-side flow passage 20.

FIG. 9B is an illustration of an example of a relationship of inclinations, which is different from that of FIG. 9A. The normal of the plane of the inflow port 191a and the normal of the plane of the outflow port 191b of the connection flow passages 19 are at an angle of 90 degrees with respect to the flow of air 4 flowing through the pipe. However, the normal of the plane of the inflow port 191a and the normal of the plane of the outflow port 191b of the connection flow passages 19 are not perpendicular to the projection plane of the main flow passage onto the plane having the flow of air 4 flowing through the pipe as the normal. Even with the flow passage described above, the contaminants can be prevented from flowing into the flow rate detection element-side flow passage 20.

Figure 10A:
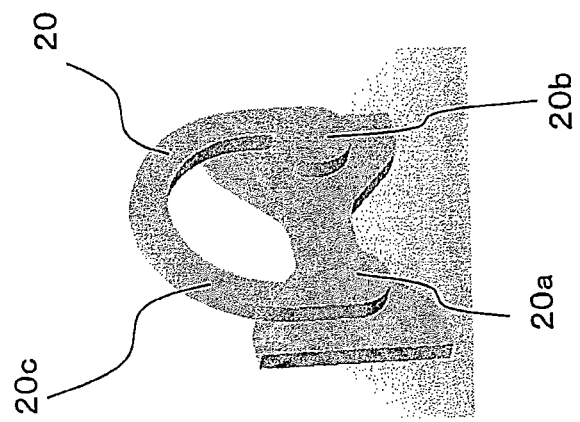
FIG. 10A is an explanatory view for illustrating a shape of the flow passage in the flow rate measuring device according to the first embodiment of the present invention.

Next, the fifth configuration in the first embodiment is described. FIG. 10 are explanatory views for illustrating a shape of the flow passage 15 in the flow rate measuring device according to the first embodiment of the present invention. FIG. 10A is a perspective view, and FIG. 10B is a front view.

Figure 10B:
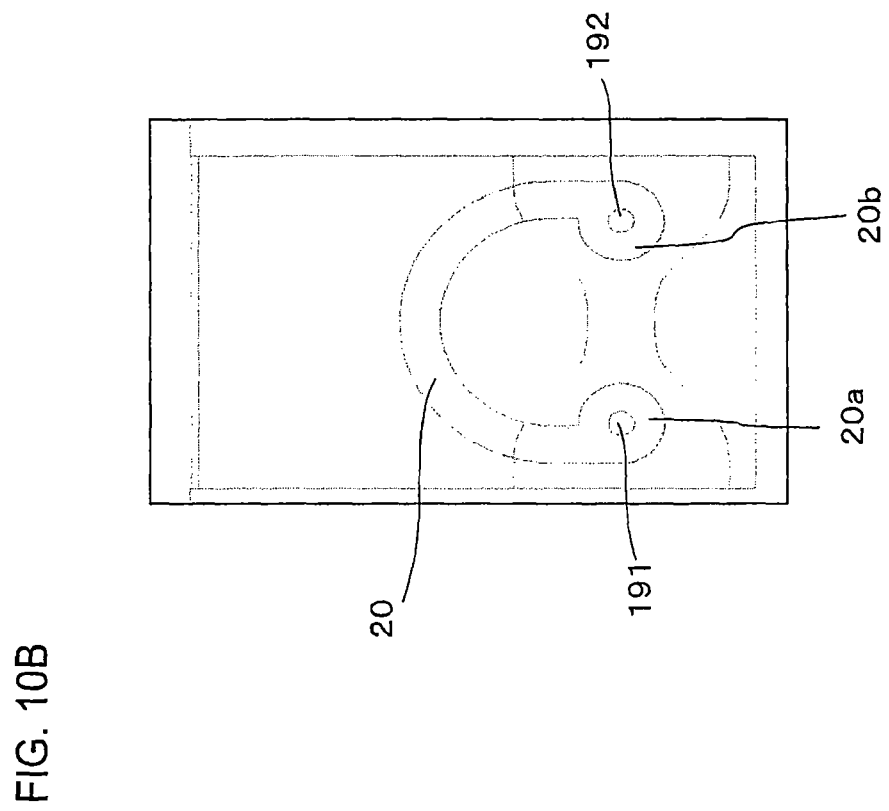
FIG. 10B is an explanatory view for illustrating the shape of the flow passage in the flow rate measuring device according to the first embodiment of the present invention.

In the fifth embodiment, as illustrated in FIG. 10B, the flow rate detection element-side flow passage 20, which is connected to the connection flow passages 191 and 192, has spaces 20a and 20b, each being larger than a flow passage size of each of the connection flow passages 19.

Next, the effects of the presence of the large spaces 20a and 20b described above are described. After the flow out from the connection flow passages 19 collides against the wall face of the flow rate detection element-side flow passage 20, the flow moves into a flow passage portion 20c. Thus, with the large spaces 20a and 20b, the influence of the flow velocity distribution flowing out from the connection flow passages 19 can be reduced.

In the fifth configuration, the flow rate detection element-side flow passage 20 having a smooth arc-like shape is formed to have the spaces 20a and 20b. Through the reduction of the influence of fluctuation of the air 4 flowing through the pipe with the formation of the spaces 20a and 20b and the smooth movement of the fluid into the flow rate detection element 16 with the flow passage 20 having the arc-like shape, fluctuation in output due to the fluctuation in flow such as a vortex of the air 4 can be reduced.

Further, in the fifth configuration, the flow rate detection element-side flow passage 20 has the arc-like shape. Thus, the flow in the flow passage around the connection flow passages 19 of the flow rate detection element-side flow passage 20 moves in a direction perpendicular to the flow in the main flow passage 18 and then becomes parallel thereto. Accordingly, even with the configuration described above, the air flows in parallel to the flow in the main flow passage 18. Therefore, the flow passage can be compactified as compared to that in a related-art structure.

As described above, according to the first embodiment, the first to fifth configurations are combined as needed. As a result, the flow rate measuring device capable of providing remarkable effects in prevention of the breakdown of the detection element and the reduction of measurement accuracy due to the contaminants not only when the flow rate, which is the measurement target, flows in the forward direction but also when the flow rate flows in the backward direction is achieved.

In particular, when the configuration including the first configuration and the second configuration is adopted so that the connecting portion 191a is provided in the region between the straight portion 181a and the smallest flow passage sectional area portion 18c, in which the flow passage is gradually narrowed, and the connecting portion 192b is provided in the region between the smallest flow passage sectional area portion 18c and the straight portion 181b, in which the flow passage is gradually enlarged, the above-mentioned remarkable effects are achieved.

Second Embodiment

Figure 11A:
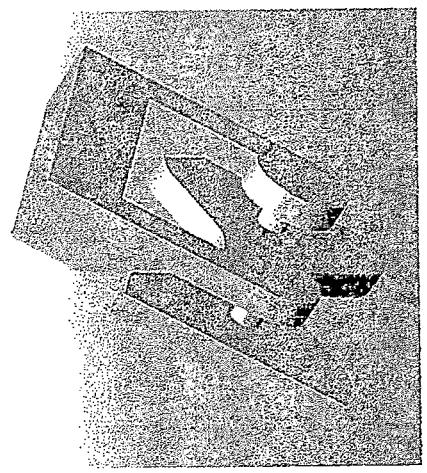
FIG. 11A is an explanatory view for illustrating a shape of a flow passage in a flow rate measuring device according to a second embodiment of the present invention.

FIG. 11 are explanatory views for illustrating a shape of the flow passage 15 in the flow rate measuring device according to the second embodiment of the present invention. FIG. 11A is a perspective view, and FIG. 11B is a front view.

In the second embodiment, as illustrated in FIG. 11B, the flow passage 15 is arranged so that at least a flow passage portion 20d corresponding to a portion of the projection plane of the flow rate detection element-side flow passage 20 overlaps an extension line 41a of one side of the projection plane of the main flow passage, which is projected onto the plane having the flow 4 of the air flowing through the pipe as the normal.

Specifically, in the configuration of FIG. 11, a flow passage height of the flow passage portion 20d of the flow rate detection element-side flow passage 20 in the vicinity of the flow rate detecting portion 16a is increased to be larger than that in the configuration of the first embodiment described above.

Figure 12:
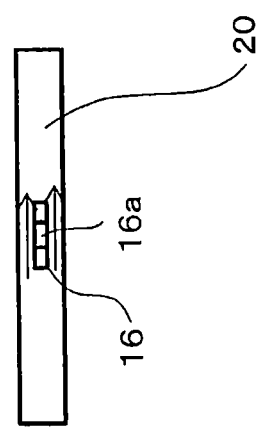
FIG. 12 is a schematic view in a case in which a fluid is caused to flow over both faces of a flow rate detection element in the second embodiment of the present invention.

Next, the effects obtained with the flow passage portion 20d described above are described. FIG. 12 is a schematic view in a case in which the fluid is caused to flow over both faces of the flow rate detection element 16 in the second embodiment of the present invention. As illustrated in FIG. 12, the sensitivity of the flow rate detection element 16 is sometimes improved through the flow of air over both faces of the flow rate detection element 16.

In the configuration described above, as described with reference to FIG. 4 referred to above, the flow passage height is required to be increased in height corresponding to a thickness of the flow rate detection element 16 in comparison to a case in which the air is caused to flow over one of the faces of the flow rate detection element 16.

On the other hand, in the configuration of FIG. 11 in the second embodiment, the flow rate detection element-side flow passage 20 is provided on the extension line 41a of the one side of the projection plane of the main flow passage 18, which is projected onto the plane having the flow of the air 4 through the pipe as the normal. In this manner, a space can be effectively used. As a result, while the downsizing of the flow passage 15 is achieved in the flow rate measuring device, the sensitivity of the flow rate detection element 16 can be increased.

As described above, according to the second embodiment, the shape of the flow rate detection element-side flow passage is modified so that the space can be effectively used. As a result, the downsizing of the flow passage in the flow rate measuring device and the improvement of sensitivity of the flow rate detecting element can be achieved at the same time.

Third Embodiment

Figure 13:
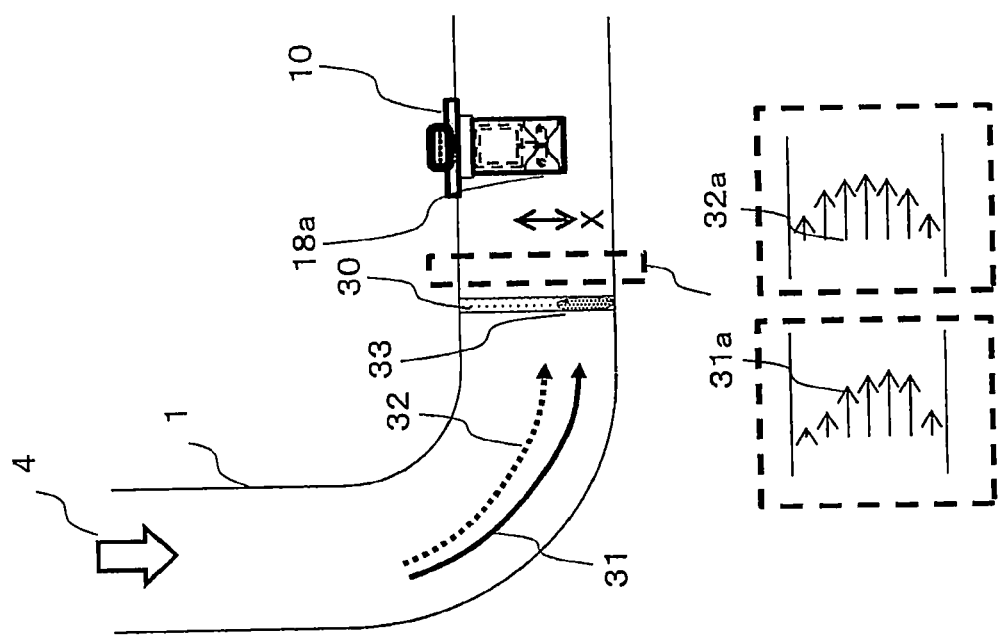
FIG. 13 is a positional relationship between a pipe and a flow rate measuring device in a third embodiment of the present invention.

FIG. 13 is a view for illustrating a positional relationship between the pipe 1 and the flow rate measuring device 10 in a third embodiment of the present invention. A configuration in the third embodiment is provided so that, as illustrated in FIG. 13, a direction of a large width of the inflow port 18a becomes approximately the same as a direction of a line for connecting a region inside the pipe 1, in which the air velocity is the highest, and the center of the pipe. The direction corresponds to the X direction indicated by the double arrow in FIG. 13.

Next, the effects of the above-mentioned arrangement are described. As illustrated in FIG. 13, on an upstream side of the pipe 1 in which the flow rate measuring device 10 is installed, a filter 30 is generally installed so as to remove large contaminants 33.

The pipe is installed in a small area inside an engine room. Hence, even under an initial state in which the filter 30 is not contaminated, the region in which the air velocity is the highest is not necessarily located at the center of the pipe as indicated by an airflow 31. Accordingly, even after the air passes through the filter 30, an air velocity distribution with the highest air velocity not located at the center of the pipe may sometimes be generated as indicated by an air velocity distribution 31a.

After long-time use, the contaminants 33 accumulate on a portion of the filter 30, through which the air passes, to cause clogging. As a result, the airflow turns from the airflow 31 into an airflow 32. As a result, the air velocity distribution 31a turns into an air velocity distribution 32a.

In general, the flow rate measuring device 10 is calibrated so that a desired output is obtained under the initial state in which the filter 30 is not contaminated. Thus, when the airflow distribution in the pipe 1 changes, an output value changes even though an average flow rate remains unchanged. As a result, an error is generated.

Meanwhile, the configuration of the third embodiment, the air is collected from the inflow port 18a having a large width in one direction. Then, the flow passage is smoothly narrowed. Thus, for a large-width direction, the flow rate in the flow passage 15 in the flow rate measuring device 10 scarcely changes even when the distribution of flow of the air 4 flowing through the pipe changes.

Thus, the large-width direction of the inflow port 18a is set to a direction for compensating for the change in air velocity distribution, which is generated with elapse of time due to, for example, contamination of the filter 3, specifically, a direction along the line for connecting the region in the pipe, in which the air velocity is the highest, and the center of the pipe. In this manner, the reduction in measurement accuracy can be suppressed.

As described above, according to the third embodiment, the large-width direction of the inflow port of the main flow passage is set to the direction for compensating for the change in air velocity distribution, which is generated with elapse of time. As a result, the reduction in measurement accuracy can be suppressed.

Fourth Embodiment

Figure 14:
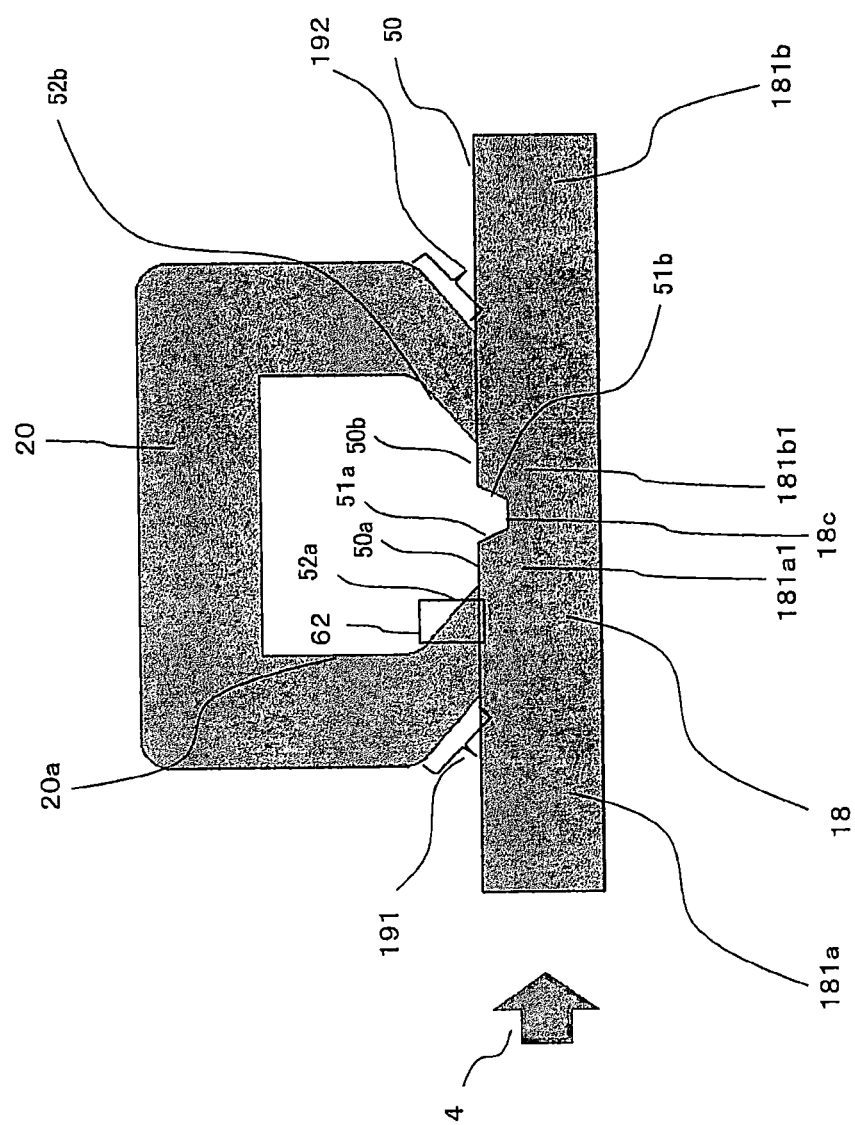
FIG. 14 is a view for illustrating a shape of a flow passage in a flow rate measuring device in a fourth embodiment of the present invention.
Figure 15:
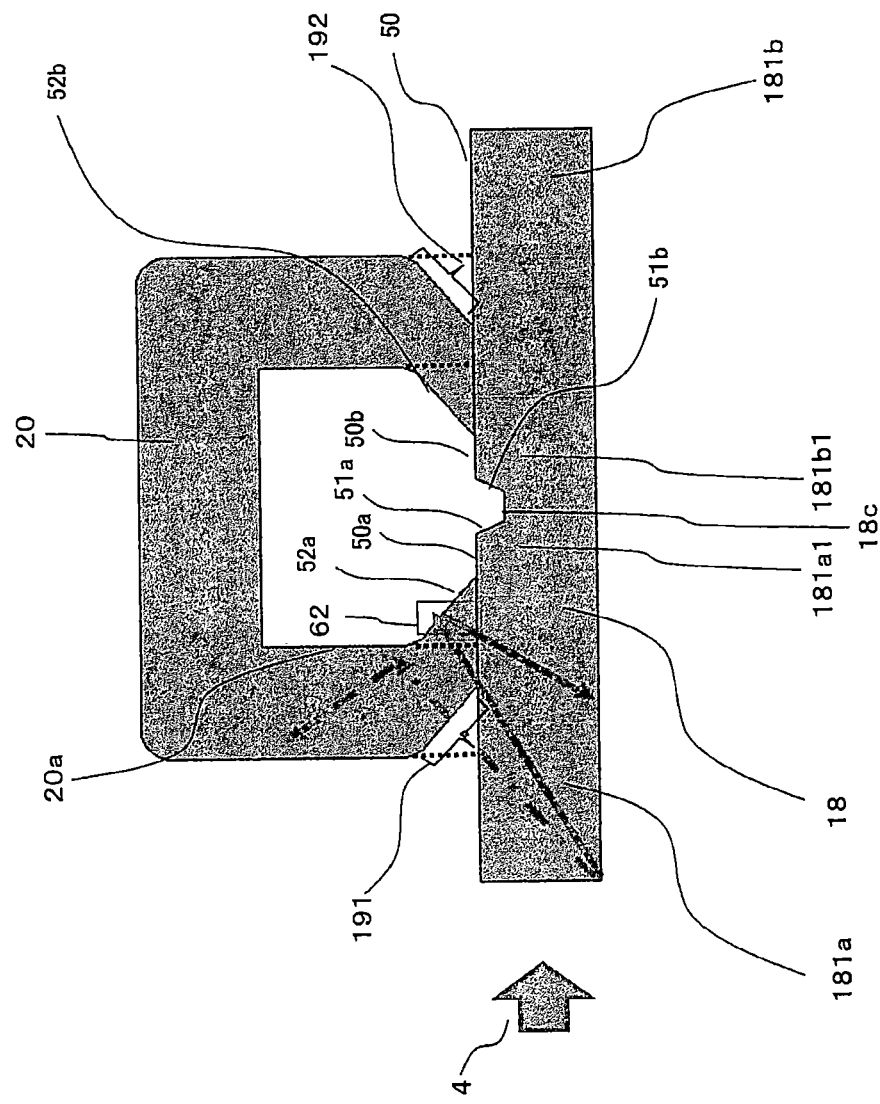
FIG. 15 is a view for illustrating a behavior when contaminants flow into the flow passage in the configuration of FIG. 14 in the fourth embodiment of the present invention.

In a fourth embodiment, a configuration having features in shape of a flow passage in a flow rate measuring device is described in detail. FIG. 14 is a view for illustrating a shape of a flow passage in a flow rate measuring device in the fourth embodiment of the present invention. FIG. 15 is a view for illustrating a behavior when the contaminants flow into the flow passage in the configuration of FIG. 14 in the fourth embodiment of the present invention.

FIG. 15 is an illustration of the behavior when the contaminants have a high risk of flowing into the detection element-side flow passage, specifically, when the contaminants flow in a direction from the lower left side to the upper right side on the paper. As already described above, the contaminants flowing from the inflow port flow straight by inertia.

The connection flow passages in the fourth embodiment have the following structure.

The connection flow passages are provided at portions narrower than the inflow port.

The connection flow passages are provided at an angle equal to or larger than 90 degrees with respect to the flow direction of the fluid to be measured.

The connection flow passages are provided so as to be narrower than the detection element-side flow passage.

Specifically, the flow rate measuring device in the fourth embodiment has a connection flow passage structure configured to prevent the contaminant from directly flowing into the detection element-side flow passage.

As indicated by the dotted lines in FIG. 15, there is considered a case in which each of the connection flow passages has the same size as the detection element-side flow passage, and is connected perpendicularly to the main flow passage 18, specifically, the connection flow passages 191 and 192 are omitted. In this case, when the angle at which the contaminants flow into the main flow passage 18 with respect to the main flow passage 18, the contaminants sometimes flow into the detection element-side flow passage as indicated by the arrowed dotted lines.

On the other hand, through adoption of the configuration of the connection flow passage 191 on the upstream side as in the fourth embodiment, the inflow of the contaminants indicated by the arrowed dotted lines can be blocked. Further, the contaminants flowing into the connection flow passage 191 on the upstream side through the flow passage indicated by the arrowed solid lines in FIG. 15 collide against a wall face 52a contained in a region 62 to be reflected thereby to flow toward the main flow passage 18. Thus, through adoption of the connection flow passage structure as illustrated in FIG. 14 and FIG. 15, the inflow of the contaminants into the detection element-side flow passage can be suppressed.

Figure 16:
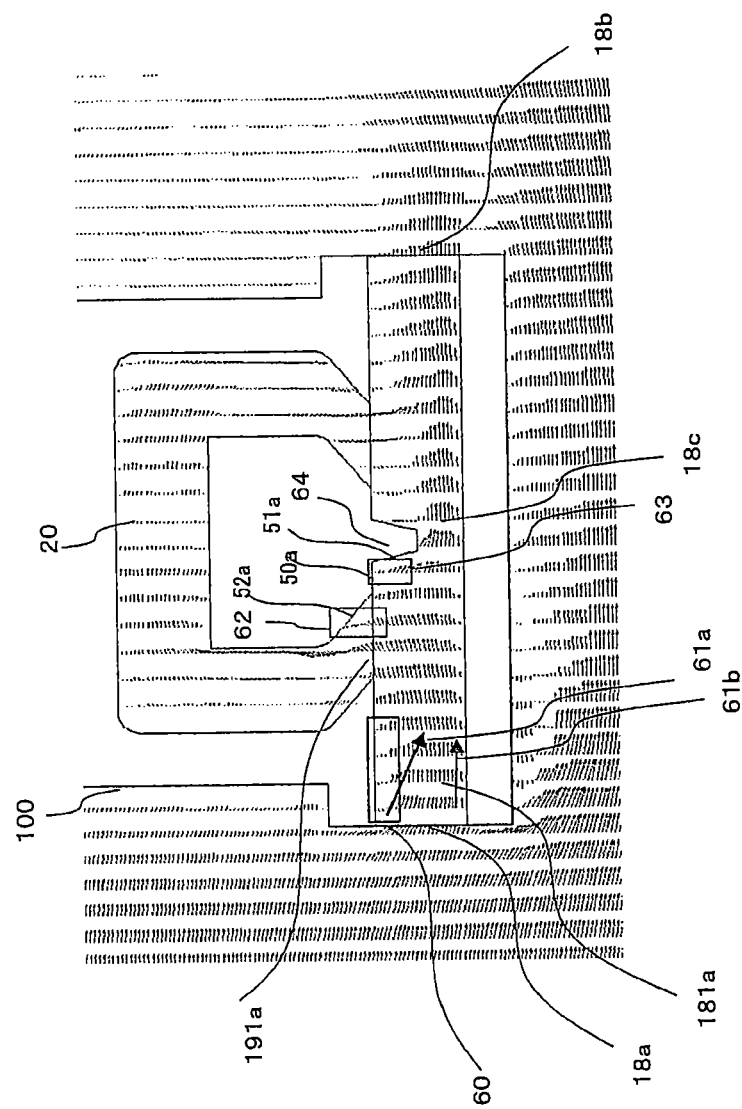
FIG. 16 is an explanatory view for illustrating an example of flow of a fluid in the flow rate measuring device in the fourth embodiment of the present invention.

Next, there is described a case in which the contaminants flow in parallel to the main flow passage. FIG. 16 is an explanatory view for illustrating an example of flow of the fluid in the flow rate measuring device in the fourth embodiment of the present invention. A region 60 illustrated in FIG. 16 corresponds to a region in which the turbulence of the flow is generated in the vicinity of the inflow port 18a. As is apparent from FIG. 16, it is understood that, with the formation of the first straight portion 181a, the turbulence of the flow, which may be generated in the vicinity of the inflow port 18a, is suppressed.

When the fluid passes through the inflow port 18a, contracted flow is generated. Thus, the flow of the fluid in the vicinity of the inflow port 18a is oriented to directions indicated by an arrow 61a and an arrow 61b. As a result, the fluid passing through the inflow port 18a flows toward the small flow passage sectional area portion 18c instead of flowing in a direction toward the inflow port 191a of the connection flow passage 19. Thus, the inflow contaminants, which have a large weight and the inertia, is discharged via the small flow passage sectional area portion 18c and the outflow port 18b.

For the arrows indicating the directions of flow of the fluid, the arrow 61b indicates an approximately straight direction, and the arrow 61a indicates an inclined direction. As illustrated in FIG. 16, the air 4 flowing through the pipe collides against a wall face 100 of the main body portion 11 mounted into the device insertion hole 2 to flow into the inflow port 18a. Thus, the flow of the fluid is in a state inclined in the direction indicated by the arrow 61a in a region close to the wall face 100 of the main body portion 11.

In the fourth embodiment, as illustrated in FIG. 14, a first straight portion 181a1 being part of the first straight portion 181a is formed between the small flow passage sectional area portion 18c and the connection flow passage 191 on the upstream side.

As illustrated in FIG. 16, part of the fluid to be measured, which has flown into the main flow passage 18, is largely diverted to flow into the detection element-side flow passage 20. In the region 62 of FIG. 6, the diversion occurs in the vicinity of the wall face 52a. As a result, it is understood that the flow in the direction toward the detection element-side flow passage 20 is generated.

Part of the contaminants flowing into the main flow passage 18 sometimes collide against a wall face 51a of the small flow passage sectional area portion 18c to be reflected thereby. In the fourth embodiment, the first straight portion 181a1 being part of the first straight portion 181a is formed between the small flow passage sectional area portion 18c and the connection flow passage 191 on the upstream side. As a result, a distance between the small flow passage sectional area portion 18c and the connection flow passage 191 on the upstream side can be increased, to thereby suppress the inflow of the reflected contaminant into the detection element-side flow passage 20.

For the same reason, the second straight portion 181*b*1 being part of the second straight portion 181*b* is formed between the small flow passage sectional area portion 18*c* and the connection flow passage 192 on the downstream side.

Figure 17:
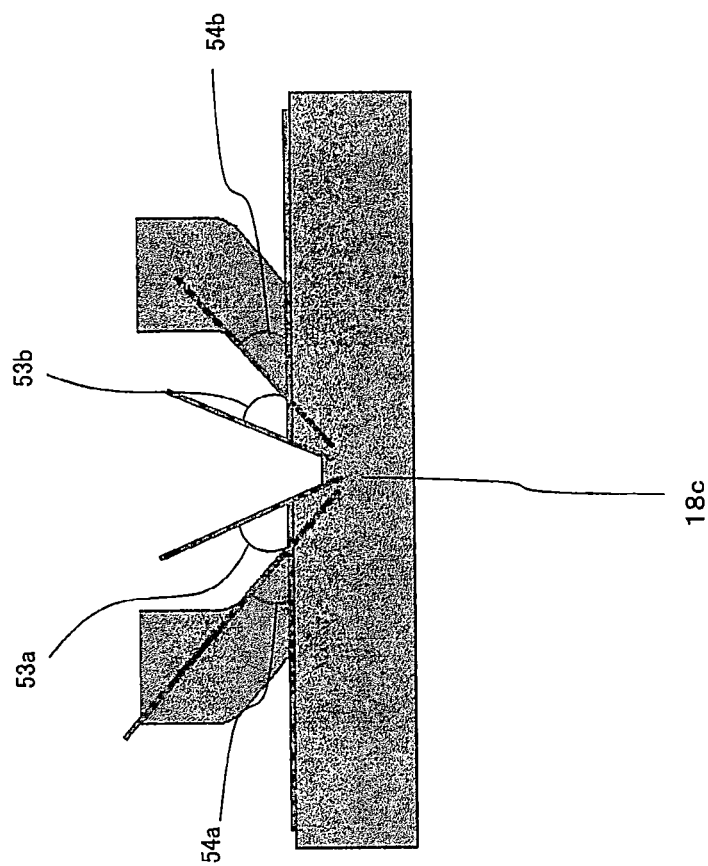
FIG. 17 is a view for illustrating a relationship between connection flow passages and a main flow passage in the flow rate measuring device in the fourth embodiment of the present invention.

FIG. 17 is a view for illustrating the connection flow passages and the main flow passage in the flow rate measuring device in the fourth embodiment of the present invention. In the fourth embodiment, as already described with reference to FIG. 14 to FIG. 16, the connection flow passages are installed at the angle equal to or larger than 90 degrees with respect to the flow direction of the fluid to be measured through the pipe.

In particular, the connection flow passages in the fourth embodiment have the following configurations.

The first straight portion 181*a*1 being part of the first straight portion 181*a* is formed between the small flow passage sectional area portion 18*c* and the connection flow passage 191 on the upstream side.

The second straight portion 181*b*1 being part of the second straight portion 181*b* is formed between the small flow passage sectional area portion 18*c* and the connection flow passage 192 on the downstream side.

An angle 53*a* formed between a flow passage wall face 50*a* of the first straight portion 181*a*1 and the wall face 51*a* of the small flow passage sectional area portion is larger than an angle 54*a* formed between the flow passage wall face 50*a* of the first straight portion 181*a*1 and a wall face 52*a* of the connection flow passage 191.

Similarly, an angle 53*b* formed between a flow passage wall face 50*b* of the second straight portion 181*b*1 and the wall face 51*b* of the small flow passage sectional area portion is larger than an angle 54*b* formed between the flow passage wall face 50*b* of the second straight portion 181*b*1 and a wall face 52*b* of the connection flow passage 191.

The flow rate measuring device according to the fourth embodiment has the following configuration and features. Specifically, the small flow passage sectional area portion 18*c* has a function of causing the fluid to flow into the detection element-side flow passage 20. With increase in angle between each of the connection flow passages and the main flow passage, the inflow of the contaminants is suppressed.

Further, as illustrated in FIG. 17, with the setting of the angle 53*a* and the angle 54*a* to different values and the setting of the angle 53*b* and the angle 54*b* to different values, a degree of freedom of the flow passage design is increased. Further, with the design of the flow passage so that the angle 53*a* becomes larger than the angle 54*a* and, similarly, the angle 53*b* becomes larger than the angle 54*b*, lengths of the first straight portion 181*a*1 and the second straight portion 181*b*1 can be increased. Accordingly, the inflow of the contaminant into the detection element-side flow passage 20 can be effectively suppressed.

The flow rate measuring device according to the fourth embodiment further has the following configuration and feature. Specifically, the small flow passage sectional area portion 18*c* has a third straight portion constantly having the flow passage sectional area. The third straight portion in the fourth embodiment is parallel to the first straight portion 181*a* and the second straight portion 181*b*.

A device case is formed by resin molding, and a shape thereof has a tolerance. Thus, instead of forming a distal end of the small flow passage sectional area portion 18*c* into a needle-like shape, the straight portion is formed at the distal end of the small flow passage sectional area portion 18*c*. With the configuration described above, the turbulence of the fluid is suppressed. At the same time, the influence of change of the flow, which is caused by a difference in shape due to the tolerance, can be suppressed. As a result, the measurement accuracy can be improved.

Figure 18:
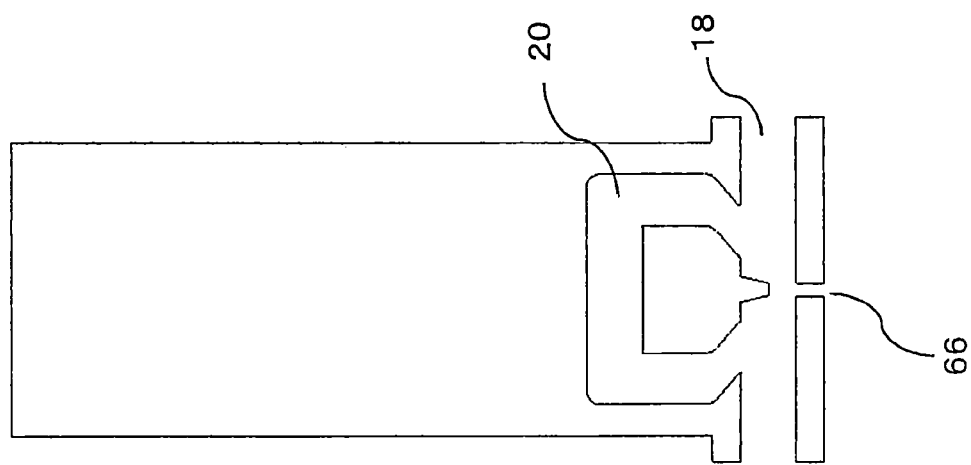
FIG. 18 is a view for illustrating an outline of the flow passage in the flow rate measuring device in the fourth embodiment of the present invention.
Figure 19:
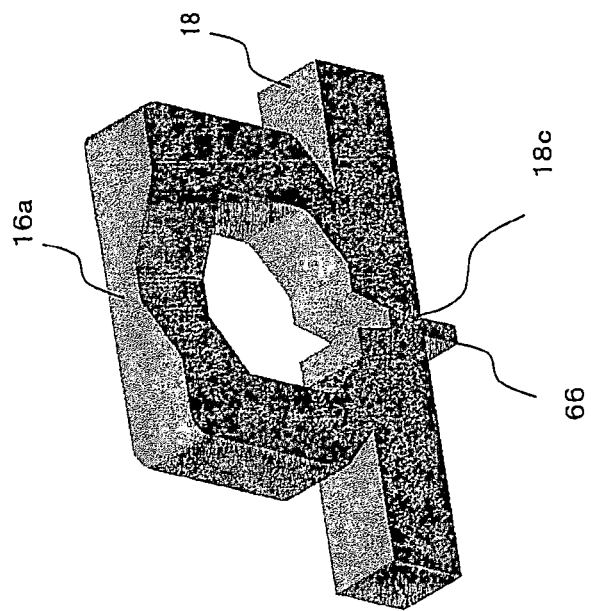
FIG. 19 is a perspective view for illustrating a relationship among a detection element-side flow passage, the connection flow passages, and the main flow passage in the flow rate measuring device in the fourth embodiment of the present invention.

FIG. 18 is a view for illustrating a schema of the flow passage in the flow rate measuring device in the fourth embodiment of the present invention. FIG. 19 is a perspective view for illustrating a relationship among the detection element-side flow passage, the connection flow passages, and the main flow passage in the flow rate measuring device in the fourth embodiment of the present invention.

A configuration illustrated in FIG. 18 and FIG. 19 includes a flow passage 66 configured to connect the small flow passage sectional area portion 18*c* and the pipe-side flow passage 17. The flow passage 66 is formed on a side opposite to the detection element-side flow passage 20 with respect to the main flow passage 18.

Part of the fluid flowing through the main flow passage 18 is discharged through the flow passage 66. Thus, the flow of the fluid in the vicinity of the inflow port 18*a*, which is indicated by the arrow 61*a* in FIG. 16 referred to above, can be directed in a direction further away from the connection flow passage 191 and the detection element-side flow passage 20. As a result, the inflow of the contaminants, which have been flown into the main flow passage 18, into the detection element-side flow passage 20, can be suppressed.

Figure 20:
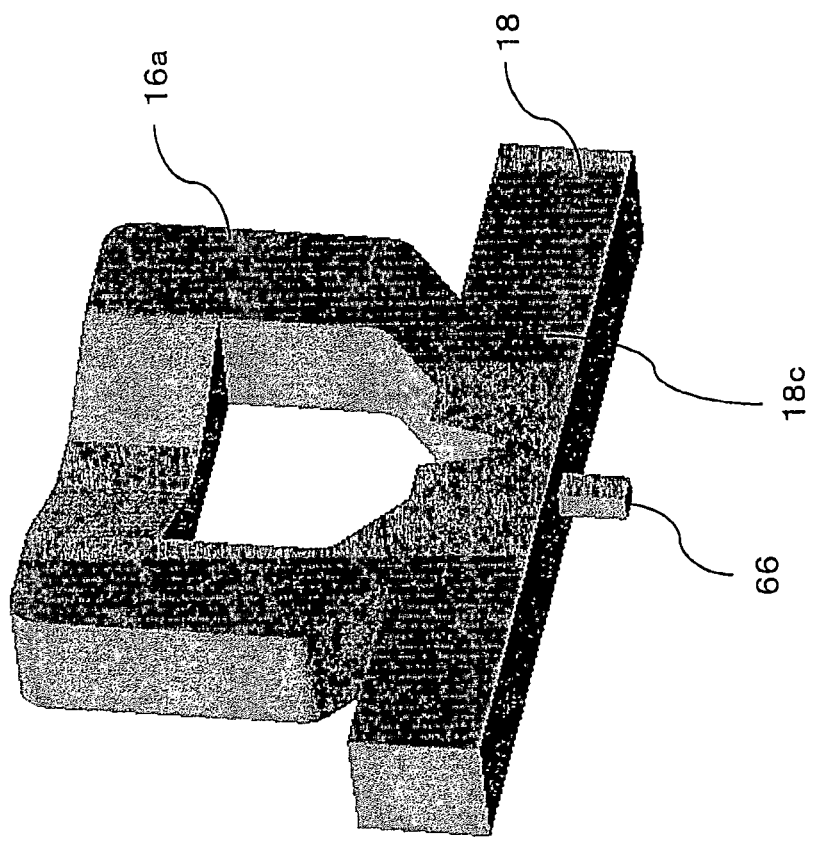
FIG. 20 is a view for illustrating a relationship among the detection element-side flow passage, the connection flow passages, and the main flow passage in the flow rate measuring device in the fourth embodiment of the present invention, and is a view for illustrating a configuration different from that of FIG. 19.

The flow rate in the detection element-side flow passage 20 can be adjusted through change of a projecting amount of a protrusion 64 configured to form the small flow passage sectional area portion 18*c* in a height direction. In FIG. 19, the flow passage 66 has the same size as a width of the main flow passage 18. However, the flow passage 66 of the present invention is not limited to the configuration described above. FIG. 20 is a view for illustrating a relationship among the detection element-side flow passage, the connection flow passages, and the main flow passage in the flow rate measuring device in the fourth embodiment of the present invention and is an illustration of a configuration different from that of FIG. 19. As illustrated in FIG. 20, the flow passage 66 may have a shape smaller than the width of the main flow passage 18, and effects equivalent to those of the configuration of FIG. 19 can be obtained.

Further, as illustrated in FIG. 19 and FIG. 20, in the fourth embodiment, a flow passage width of the detecting portion 16*a* of the detection element-side flow passage is reduced. The configuration described above is adopted to increase the flow velocity in the detecting portion 16*a*.

Fifth Embodiment

Figure 21:
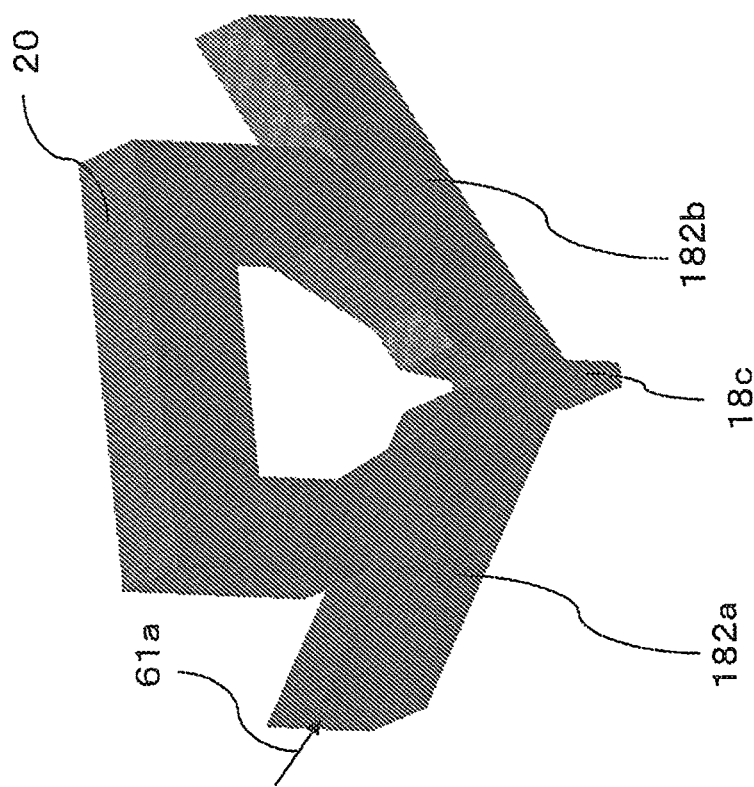
FIG. 21 is a perspective view for illustrating a relationship among a detection element-side flow passage, connection flow passages, and a main flow passage in a flow rate measuring device in a fifth embodiment of the present invention.
Figure 22:
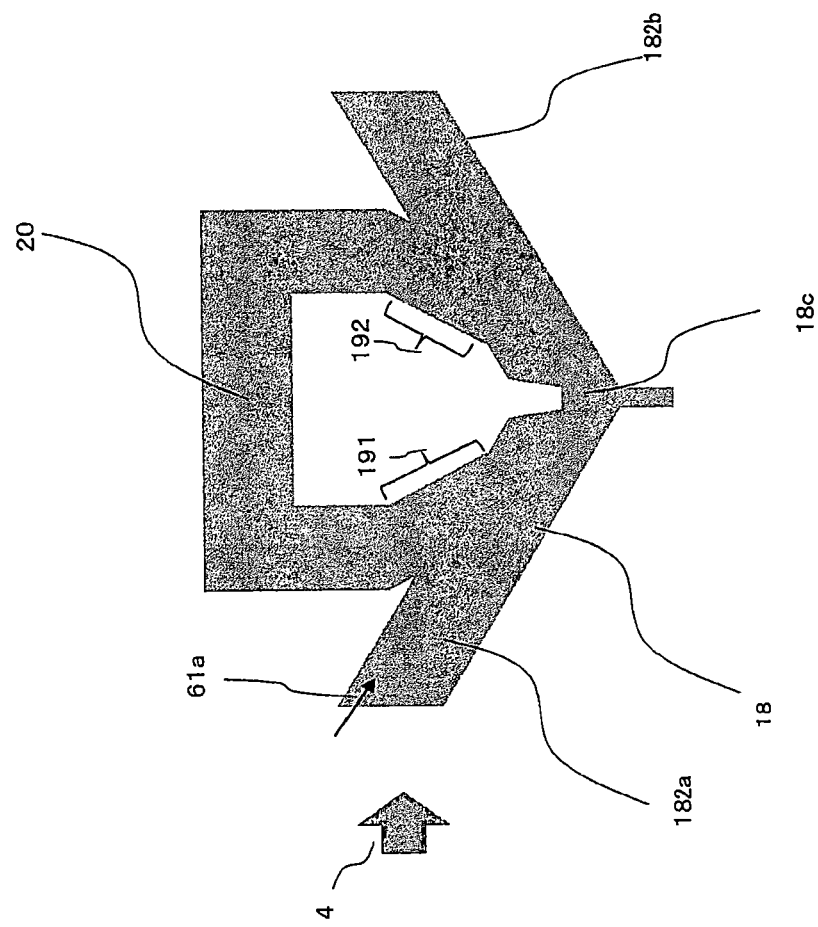
FIG. 22 is a front view for illustrating the relationship among the detection element-side flow passage, the connection flow passages, and the main flow passage in the flow rate measuring device in the fifth embodiment of the present invention.

In a fifth embodiment, a configuration having features in shape of the flow passage in the flow rate measuring device, which is different from that of the fourth embodiment described above, is described in detail. FIG. 21 is a perspective view for illustrating a relationship among the detection element-side flow passage, the connection flow passages, and the main flow passage in the flow rate measuring device in the fifth embodiment of the present invention. FIG. 22 is a front view for illustrating a relationship among the detection element-side flow passage, the connection flow passages, and the main flow passage in the flow rate measuring device in the fifth embodiment of the present invention.

In the configuration exemplified in FIG. 21 and FIG. 22 in the fifth embodiment, the connection flow passages 19 are defined as the straight portion 191 and the straight portion 192, each having a width smaller than those of the main flow passage 18 and the detection element-side flow passage 20.

In the fifth embodiment, a first straight portion 182a of the main flow passage 18 is formed so as to be inclined to the side opposite to the detection element-side flow passage 20 with respect to the direction of the air 4 flowing through the pipe. Similarly, a second straight portion 182b of the main flow passage 18 is formed so as to be inclined to the side opposite to the detection element-side flow passage 20 with respect to the direction of the air 4 flowing through the pipe.

As described above in the fourth embodiment with reference to FIG. 16, the air 4 flowing through the pipe collides against the wall face 100 to flow into the inflow port 18a. Thus, in a region close to the wall face side of the main body portion 11, the flow of the air is inclined in the direction indicated by the arrow 61a.

Accordingly, in the fifth embodiment, as illustrated in FIG. 22, the main flow passage 18 is inclined. Along the inclination, the air is introduced into the main flow passage 18. With the adoption of the configuration described above, the contaminants having a large weight can more easily be moved straight. At the same time, a more acute angle can be set as an angle between the main flow passage 18 and each of the connection flow passages 19. As a result, the inflow of the contaminant into the detection element-side flow passage 20 can be further suppressed in comparison to the configuration described above in the fourth embodiment.

With the inclination of the main flow passage 18, the size of the flow passage is increased.

Figure 23:
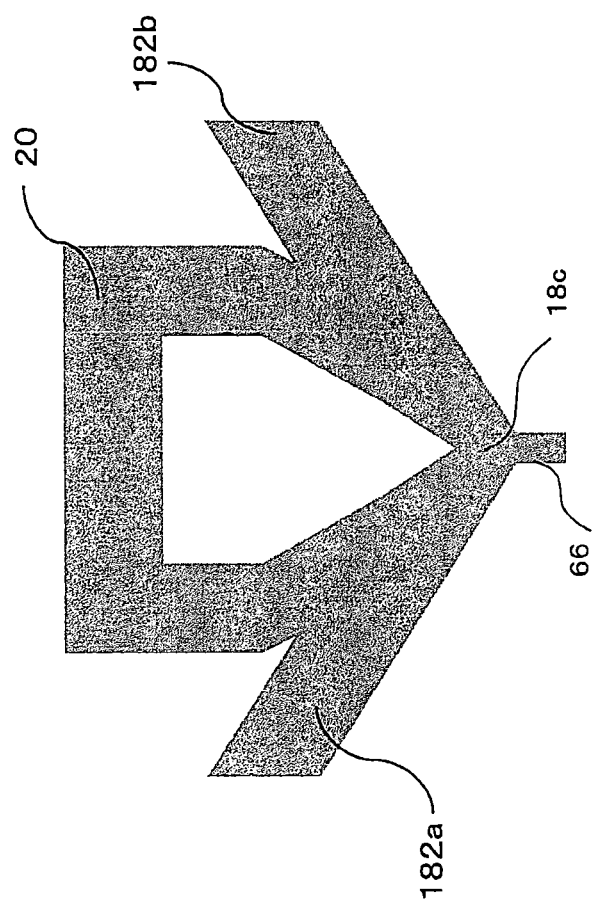
FIG. 23 is a front view for illustrating the relationship among the detection element-side flow passage, the connection flow passages, and the main flow passage in the flow rate measuring device in the fifth embodiment of the present invention.

FIG. 23 is a front view for illustrating a relationship among the detection element-side flow passage, the connection flow passages, and the main flow passage in the flow rate measuring device in the fifth embodiment of the present invention. More specifically, FIG. 23 is an illustration of a configuration regarding the flow passage including the main flow passage 18 inclined along inclination of the flow of the air, which is different from that of FIG. 22 referred to above.

In the configuration of FIG. 23, the first straight portion 181a1, which is part of the first straight portion 181a, and the second straight portion 181b1, which is part of the second straight portion 181b are not formed.

With the shape described above, the contaminants can be more smoothly moved to the small flow passage sectional area portion 18c without being allowed to collide against and reflected by the wall face.

Figure 24:
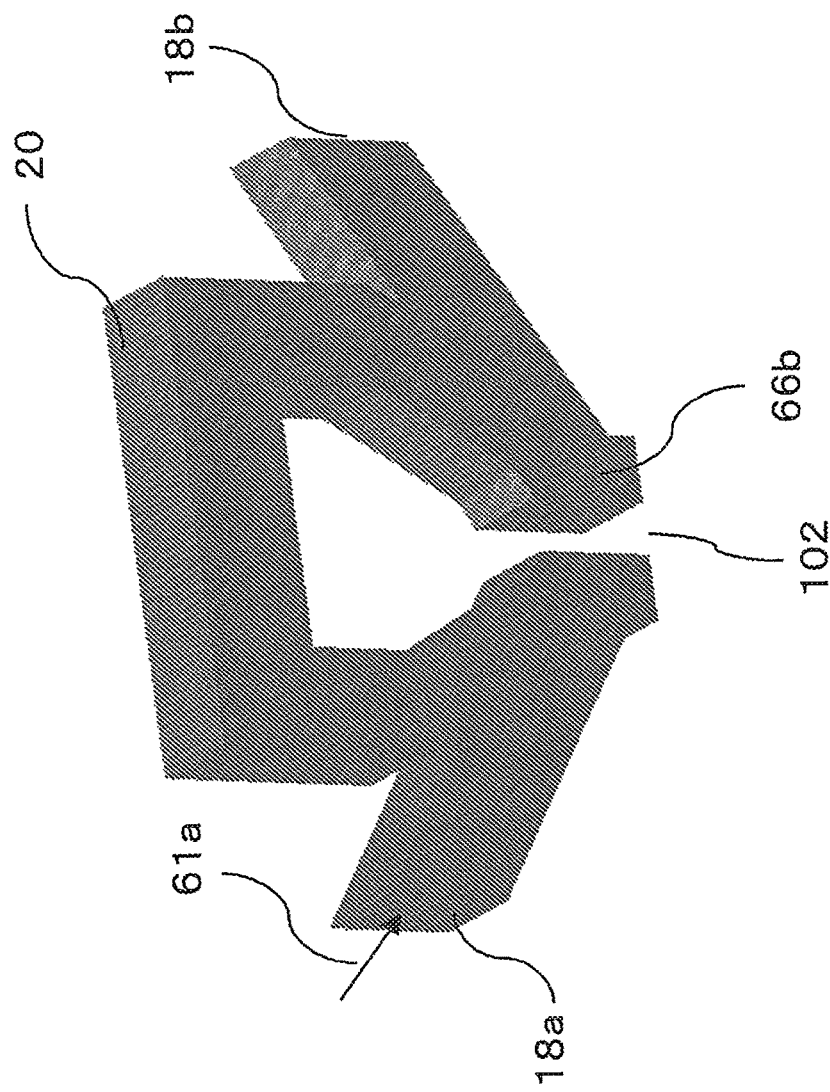
FIG. 24 is a perspective view for illustrating the relationship among the detection element-side flow passage, the connection flow passages, and the main flow passage in the flow rate measuring device in the fifth embodiment of the present invention, which is different from FIG. 21.
Figure 25:
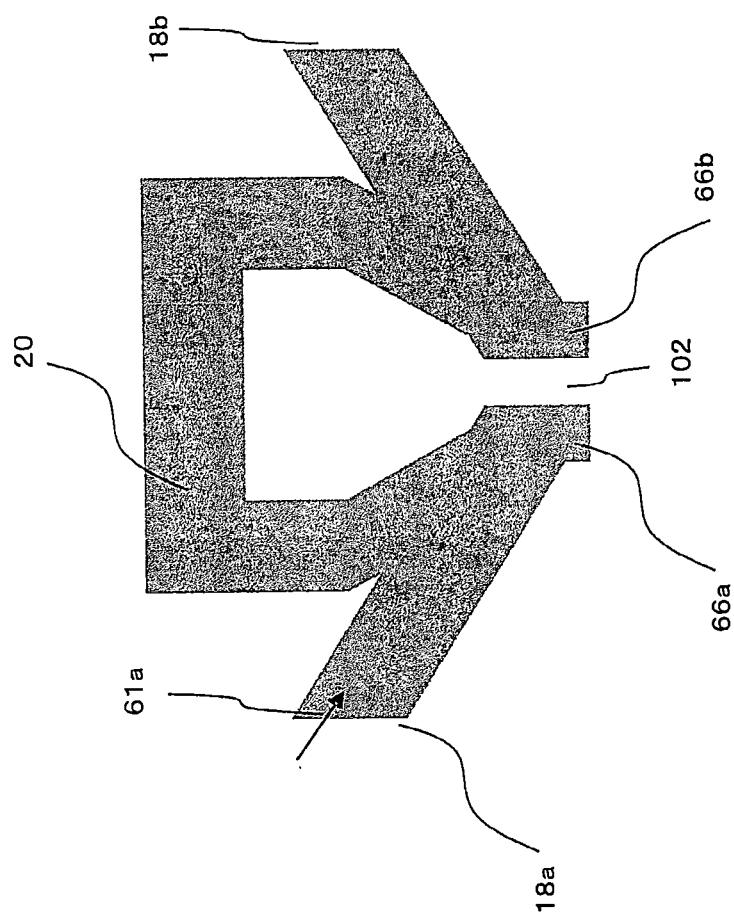
FIG. 25 is a front view for illustrating the relationship among the detection element-side flow passage, the connection flow passages, and the main flow passage in the flow rate measuring device in the fifth embodiment of the present invention, which is different from FIG. 22 and FIG. 23.

FIG. 24 is a perspective view for illustrating a relationship among the detection element-side flow passage, the connection flow passages, and the main flow passage in the flow rate measuring device in the fifth embodiment of the present invention, which is different from FIG. 21 referred to above. FIG. 25 is a front view different from FIG. 22 and FIG. 23 referred to above, for illustrating a relationship among the detection element-side flow passage, the connection flow passages, and the main flow passage in the flow rate measuring device in the fifth embodiment of the present invention.

In the configuration illustrated in FIG. 24 and FIG. 25, the small flow passage sectional area portion 18c is formed to have wall faces 102. In this manner, a flow passage 66a configured to connect the pipe-side flow passage 17 and a portion of the main flow passage, which is located on the inflow port 18a side, and a flow passage 66b configured to connect the pipe-side flow passage 17 and part of the main flow passage, which is located on the outflow port 18b side, are formed.

With the configuration described above, all the flow rate of the air other than that required for the detection element-side flow passage 20 is discharged through the flow passages 66a and 66b. Thus, the flow of the fluid 61a flowing from the inflow port flows toward the flow passage 66a. Accordingly, the contaminants having a large weight are more easily discharged from the flow passage 66a. As a result, a structure in which the contaminant is unlikely to flow into the detection element-side flow passage 20 can be achieved.

In the structure illustrated in FIG. 25, the fluid is discharged to the pipe region below the main body 11 via the flow passages 66a and 66b. It is apparent that the structure may be such that the fluid is discharged to side faces of the main body 11.

REFERENCE SIGNS LIST 1 pipe, 2 device insertion hole, 4 air flowing through pipe, 4a air flowing through pipe (back ward flow), 5 air flowing into flow passage, 5a air which flows out from outflow port without flowing through flow rate detection element-side flow passage 20, 5b air flowing through flow rate detection element-side flow passage 20, 10 flow rate measuring device, 11 main body portion, 12 flange portion, 14 circuit accommodating portion, 14a circuit board, 15 flow passage inside flow rate measuring device, 16 rate detection element, 16a detecting portion, 17 pipe-side flow passage, 18 main flow passage, 18a inflow port of main flow passage, 18b outflow port of main flow passage, 18c small flow passage sectional area portion, 181a straight portion on upstream side, 181b straight portion on downstream side, 19 connection flow passage, 191 connection flow passage on upstream side, 191a inflow port of connection flow passage 191, 191b outflow port of connection flow passage 191, 192 connection flow passage on downstream side, 192a inflow port of connection flow passage 192, 192b outflow port of connection flow passage 192, 20 flow rate detection element-side flow passage, 20a, 20b large space, 20c flow rate detection element-side flow passage except for 20a, 20b, 20d flow passage portion in vicinity of flow rate detecting portion 16a, 30 filter, airflow before contamination of filter, 31a air velocity distribution before contamination of filter, 32 airflow after contamination of filter, 32a air velocity distribution after contamination of filter, 33 large contaminant, 35 plane, 40 straight line, 41a, 41b extension line of projection plane of main flow passage, which is projected onto plane having flow of air 4 flowing through pipe as normal

The invention claimed is:

1. A flow rate measuring device, comprising:
  a connector portion, which is arranged outside a pipe flowing a fluid to be measured, and is configured to transmit and receive a signal to and from an exterior;
  a main body portion extended from the connector portion so as to be located in the pipe;
  an internal flow passage, which is formed inside the main body portion, and is configured to cause part of the fluid to be measured flowing through the pipe to flow therethrough; and
  a flow rate detection element, which is installed in the internal flow passage, and is configured to detect a flow rate of the fluid to be measured,
  wherein the internal flow passage includes:
    a main flow passage configured to extend from an inflow port configured to introduce the part of the fluid to be measured flowing through the pipe to an outflow port configured to return the introduced part of the fluid to be measured to the pipe; and
    a sub-flow passage branching from the main flow passage to bypass the main flow passage, wherein the sub-flow passage includes:
a flow detection element-side flow passage in which the flow rate detection element configured to detect the flow rate of the fluid to be measured from a flow rate of a measurement fluid is installed; and
connection flow passages configured to connect the main flow passage and the flow rate detection element-side flow passage to each other,
wherein the main flow passage includes:
an introduction portion configured to guide the fluid to be measured, which has flown into the main body portion from the inflow port, into the main body portion;
a small flow passage sectional area portion having a flow passage sectional area smaller than a flow passage sectional area of the introduction portion; and
an exit portion, which has a flow passage sectional area larger than the flow passage sectional area of the small flow passage sectional area portion, and is configured to guide the fluid to be measured to the outflow port,
wherein the connection flow passages include:
an upstream-side connection flow passage connected to the main flow passage at a position on the inflow port side with respect to the small flow passage sectional area portion; and
a downstream-side connection flow passage connected to the main flow passage at a position on the outflow port side with respect to the small flow passage sectional area portion, and
the connection flow passages are configured to introduce part of the fluid to be measured flowing through the main flow passage via the upstream-side connection flow passage as a measurement fluid to cause the measurement fluid to flow through the flow rate detection element-side flow passage and return the measurement fluid to the main flow passage via the downstream-side connection flow passage,
wherein the main flow passage and the flow rate detection element-side flow passage are formed so as to be symmetric with respect to a plane having a flow direction of the fluid to be measured flowing through the pipe as a normal, and
wherein the main flow passage has a portion at the plane of the symmetry as the small flow passage sectional area portion.

2. The flow rate measuring device according to claim 1, wherein the position at which the upstream-side connection flow passage is connected to the main body portion is closer to the small flow passage sectional area portion than the inflow port, and
wherein the position at which the downstream-side connection flow passage is connected to the main flow passage is closer to the small flow passage sectional area portion than the outflow port.

3. The flow rate measuring device according to claim 1, wherein, in the flow direction of the fluid to be measured, the introduction portion has a straight portion constantly having the same flow passage sectional area as a flow passage sectional area at the inflow port, and the exit portion has a straight portion constantly having the same flow passage sectional area as the flow passage sectional area at the outflow port.

4. The flow rate measuring device according to claim 1, wherein the connection flow passages are installed at an angle equal to or larger than 90 degrees with respect to the flow direction of the fluid to be measured flowing through the pipe.

5. The flow rate measuring device according to claim 1, to wherein each of the connection flow passages has a width smaller than a width of the flow rate detection element-side flow passage.

6. The flow rate measuring device according to claim 1, wherein the main flow passage has at least one of straight lines intersecting with the inflow port of the main flow passage and the outflow port of the main flow passage, which is non-contact with a wall face of the main flow passage, as a straight line parallel to the flow direction of the fluid to be measured.

7. The flow rate measuring device according to claim 1,
wherein the upstream-side connection flow passage is formed so as to be located in a region of a first transition portion in which the flow passage sectional area is reduced from the first straight portion constantly having the same flow passage sectional area as the flow passage sectional area at the inflow port toward the small flow passage sectional area portion, and
wherein the downstream-side connection flow passage is formed so as to be located in a region of a second transition portion in which the flow passage sectional area is increased from the small flow passage sectional area portion toward the second straight portion constantly having the same flow passage sectional area as the flow passage sectional area at the outflow port.

8. The flow rate measuring device according to claim 1, wherein the main flow passage and the flow rate detection element-side flow passage are formed to have a positional relationship so that a projection plane of the main flow passage and a projection plane of the flow rate detection element-side flow passage on the plane having the flow direction of the fluid to be measured flowing through the pipe as the normal are separate from each other.

9. The flow rate measuring device according to claim 8, wherein the flow rate detection element-side flow passage is provided so that at least part of the projection plane of the flow rate detection element-side passage overlaps an extension line of one side of the projection plane of the main flow passage onto the plane having the flow direction of the fluid to be measured flowing through the pipe as the normal to ensure a space for allowing the measurement fluid to flow over both faces of the flow rate detection element.

10. The flow rate measuring device according to claim 1,
wherein a portion of the first straight portion constantly having the same flow passage sectional area as the flow passage sectional area at the inflow port is located between the small flow passage sectional area portion and the upstream-side connection flow passage, and
wherein a portion of the second straight portion constantly having the same flow passage sectional area as the flow passage sectional area at the outflow port is located between the small flow passage sectional area portion and the downstream-side connection flow passage.

11. The flow rate measuring device according to claim 1,
wherein an angle formed between a flow passage wall face of a portion of the first straight portion constantly having the same flow passage sectional area as the flow passage sectional area at the inflow port and a wall face of the small flow passage sectional area portion is larger than an angle formed between the flow passage wall face of the portion of the first straight portion and a wall face of the connection flow passages, and wherein an angle formed between a flow passage wall face of a portion of the second straight portion constantly having the same flow passage sectional area as the flow passage sectional area at the outflow port and the wall face of the small flow passage sectional area portion is larger than an angle formed between the flow passage wall face of the portion of the second straight portion and the wall face of the connection flow passages.

12. The flow rate measuring device according to claim 1, wherein the small flow passage sectional area portion has a third straight portion constantly having the same flow passage sectional area, and
wherein the third straight portion is parallel to the first straight portion constantly having the same flow passage sectional area as the flow passage sectional area at the inflow port and the second straight portion constantly having the same flow passage sectional area as the flow passage at the outflow port.

13. The flow rate measuring device according to claim 1, wherein the internal flow passage further comprises a flow passage configured to connect the small flow passage sectional area portion and a pipe-side flow passage, wherein the flow passage is provided on a side opposite to the detection element-side flow passage with respect to the main flow passage.

14. The flow rate measuring device according to claim 1, wherein the main flow passage has a first straight portion constantly having the same flow passage sectional area as a flow passage sectional area at the inflow port and a second straight portion constantly having the same flow passage sectional area as a flow passage sectional area at the outflow port, and
wherein the first straight portion and the second straight portion are formed so as to be inclined to a side opposite to the detection element-side flow passage with respect to the flow direction of the air flowing through the pipe.

15. The flow rate measuring device according to claim 1, wherein the internal flow passage further comprises a flow passage configured to connect the inflow port and a pipe-side flow passage to each other and a flow passage configured to connect the outflow port and the pipe-side flow passage to each other.

* * * * *